United States Patent
Moseley et al.

[11] Patent Number: 5,987,205
[45] Date of Patent: Nov. 16, 1999

[54] INFRARED ENERGY TRANSMISSIVE MEMBER AND RADIATION RECEIVER

[75] Inventors: Robin C. Moseley, Allentown; James R. Graybill, Jr., Emmaus; Adam T. Lansing, Allentown, all of Pa.

[73] Assignee: Lutron Electronics Co., Inc., Coopersburg, Pa.

[21] Appl. No.: 08/713,776

[22] Filed: Sep. 13, 1996

[51] Int. Cl.$^6$ ............................... G02B 6/20
[52] U.S. Cl. ........................... 385/125; 385/92
[58] Field of Search ............... 385/125, 88, 89, 385/90, 91, 92, 12; 250/333, 338.1

[56] References Cited

U.S. PATENT DOCUMENTS

| | | | |
|---|---|---|---|
| Re. 29,172 | 4/1977 | Lutz | 361/3 |
| 2,675,505 | 4/1954 | Flurscheim et al. | 361/10 |
| 2,748,226 | 5/1956 | MacNeill et al. | 218/69 |
| 3,223,888 | 12/1965 | Koppelmann | 218/69 |
| 3,237,030 | 2/1966 | Coburn | 307/130 |
| 3,249,810 | 5/1966 | Strom et al. | 307/130 |
| 3,284,648 | 11/1966 | Koppelmann | 361/3 |
| 3,321,668 | 5/1967 | Baker | 361/3 |
| 3,395,316 | 7/1968 | Denes et al. | 361/8 |
| 3,402,324 | 9/1968 | Kesseling et al. | 361/5 |
| 3,491,315 | 1/1970 | Kesseling et al. | 335/19 |
| 3,558,910 | 1/1971 | Dale | 307/134 |
| 3,636,292 | 1/1972 | Roth | 218/118 |
| 3,639,808 | 2/1972 | Ritzow | 361/6 |
| 3,864,604 | 2/1975 | Pfanzelt | 361/6 |
| 3,868,549 | 2/1975 | Schaefer et al. | 361/13 |
| 3,982,137 | 9/1976 | Penrod | 361/8 |
| 4,074,333 | 2/1978 | Murakami et al. | 361/13 |
| 4,152,634 | 5/1979 | Penrod | 361/3 |
| 4,209,814 | 6/1980 | Garzon | 361/5 |
| 4,236,101 | 11/1980 | Luchaco | 315/158 |
| 4,251,845 | 2/1981 | Hancock | 361/8 |
| 4,346,419 | 8/1982 | Janniello | 361/2 |
| 4,349,748 | 9/1982 | Goldstein et al. | 307/140 |
| 4,389,691 | 6/1983 | Hancock | 361/8 |
| 4,392,171 | 7/1983 | Kornrumpf | 361/5 |
| 4,709,188 | 11/1987 | Roberts | 315/178 |
| 4,727,296 | 2/1988 | Zaharchuk et al. | 315/295 |
| 4,772,809 | 9/1988 | Koga et al. | 307/140 |
| 4,829,174 | 5/1989 | Booth | 250/221 |
| 4,855,612 | 8/1989 | Koga et al. | 307/140 |
| 4,889,999 | 12/1989 | Rowen | 307/31 |
| 4,930,863 | 6/1990 | Croitoriu et al. | 350/96.2 |
| 5,107,184 | 4/1992 | Hu et al. | 315/291 |
| 5,191,265 | 3/1993 | D'Aleo et al. | 315/295 |
| 5,283,706 | 2/1994 | Lillemo et al. | 361/3 |
| 5,404,080 | 4/1995 | Quazi | 315/151 |
| 5,451,843 | 9/1995 | Kahn et al. | 315/186 |
| 5,696,379 | 12/1997 | Stock | 250/343 |

FOREIGN PATENT DOCUMENTS

| | | |
|---|---|---|
| 0062004 | 10/1982 | European Pat. Off. . |
| 0344478 | 12/1989 | European Pat. Off. . |
| 0398181 | 11/1990 | European Pat. Off. . |
| 0482680 | 4/1992 | European Pat. Off. . |
| 2651395 | 3/1991 | France . |
| 4124794 | 1/1993 | Germany . |

*Primary Examiner*—Hung N. Ngo
*Attorney, Agent, or Firm*—Ostrolenk, Faber, Gerb & Soffen, LLP

[57] ABSTRACT

An infrared energy transmissive member for conducting infrared energy from a first end of the infrared energy transmissive member to a second end disposed adjacent an infrared responsive circuit component of an infrared receiver, the member comprising a flexible hollow plastic tube. Preferably, the plastic tube comprises an ester based polyurethane tube and has a malleable rod disposed in the hollow plastic tube to allow the hollow plastic tube to be bent into a claimed configuration. The infrared responsive circuit component may control, e.g., a fluorescent lamp dimming circuit or a window treatment control circuit, thereby allowing remote control of the lamp or window treatment.

58 Claims, 20 Drawing Sheets

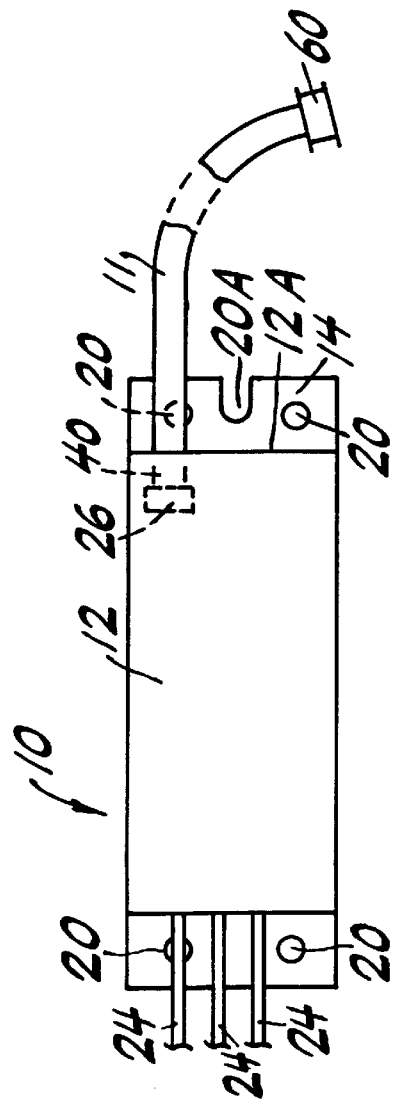
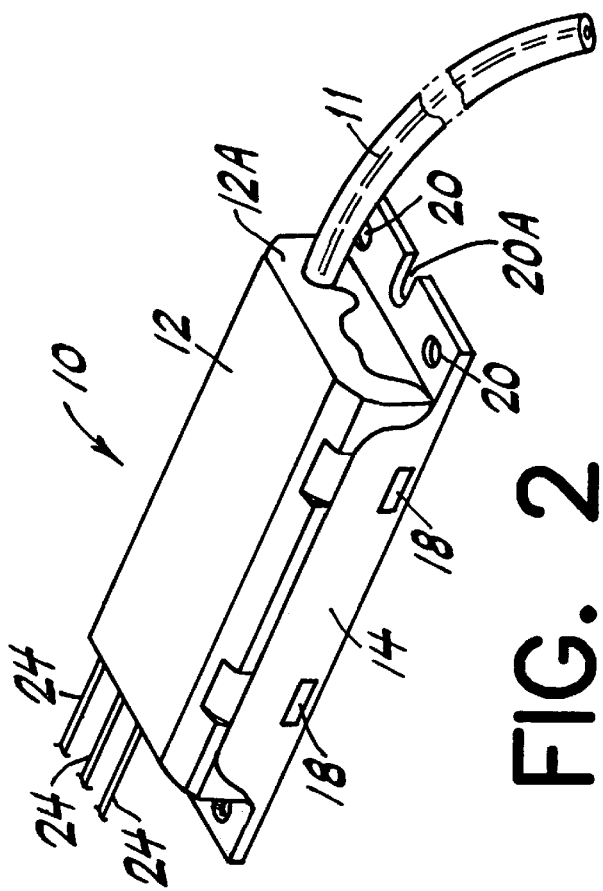
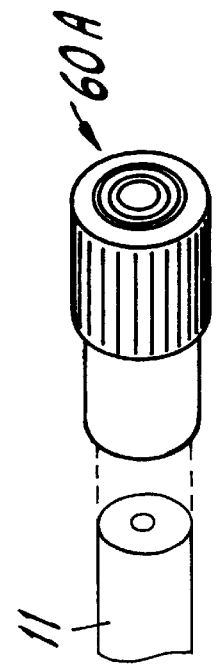
FIG. 1
FIG. 2
FIG. 9

INFRARED ENERGY TRANSMISSIVE MEMBER AND RADIATION RECEIVER

BACKGROUND OF THE INVENTION

The present invention relates to an infrared energy transmissive member and radiation receiver, particularly, an infrared energy transmissive member for conducting infrared energy to an infrared energy responsive circuit component for controlling the operation of an electrical appliance, for example, electrical lighting or electrically controlled window treatments, or other electrical devices, from a remote location via infrared energy.

This application is related to co-pending application Ser. No. 08/585,111 filed Jan. 11, 1996 assigned to the assignee of the present application and entitled "Improved System for Individual and Remote Control of Spaced Lighting Fixtures". That application describes the remote control of lighting fixtures and particularly a system and components therefore for the selective control of overhead lighting fixtures, e.g., fluorescent lamps, by a hand held infrared radiation source. This application represents an improvement to the system described in this co-pending application.

This application is also related to prior application Ser. No. 08/407,696 filed Mar. 21, 1995 entitled "Remote Control System For Individual Control of Spaced Lighting Fixtures" and assigned to the assignee of this application.

Prior known systems for remote control of lighting fixtures are described in detail in the above-noted co-pending applications.

The lighting of spaces by a plurality of spaced gas discharge lamps (for example, fluorescent lamps), or incandescent lamps is well known. Commonly, one or more fluorescent lamps are mounted in a fixture with a ballast, and such fixtures are spaced over a ceiling on four foot or eight foot centers. Similarly, overhead fixtures for incandescent lamps may be mounted on centers greater than about two feet. Such lamp fixtures are commonly connected to a single power source and are simultaneously turned on and off or, if provided with dimming capability, are simultaneously dimmed.

It is also known that such overhead fixtures can be individually controlled or dimmed. For example, in a given office space, one worker may prefer or need more or less light intensity than another worker at a spaced work area. Dimming systems are known for selectively dimming the lamps of different fixtures to suit the needs of individual workers. For example, each fixture can be individually hard wired to its own remotely mounted dimmer. However, the installation of this wiring can be quite costly and the determination of which dimmer controls which fixture may not be immediately obvious to the user of the system.

Alternatively, the dimmers could be located within each fixture and controlled by signals sent over low voltage wiring or through signals transmitted over the line voltage wiring through a power line carrier system. Unfortunately, both of these approaches require expensive interfaces within each fixture to translate and/or decode the received signals for control of the dimmer.

In another known system, a dimmer with a dimming adjustment control is provided at each fixture, and that control is manually operated, for example, by rotating the control with a rigid pole long enough to reach the fixture. In this way, each fixture can be selectively adjusted. However, this system is inconvenient to use and, once the fixture intensity is set, it is difficult or inconvenient to readjust. Moreover, it is difficult to retrofit an existing installation with a control system of this nature.

A known fluorescent controller system is also sold by Colortran Inc. of Burbank, Calif., termed a "sector fluorescent controller" in which an infrared receiver is mounted at a location spaced from its respective fluorescent lamp fixture. Thus, the receiver is fixed to a T-bar, on the wall, on a louver or is counter-sunk flush with wall or ceiling. A ballast controller may be mounted in the lighting fixture, in addition to a conventional dimming ballast. Wiring is then run from the external infrared receiver into the interior of the fixture to the ballast controller. A hand-held remote control infrared transmitter illuminates the infrared receiver at one or more fixtures to control their dimming level.

The need to run wiring from the external sensor complicates the installation of such devices. Further, since the sensor may be spaced from the fixture, it requires separate installation, and is visible to view. Moreover, the infrared transmitter of the Colortran device has a transmitting angle of 30°. Therefore, several receivers can be illuminated simultaneously, making selection of control of only one fixture difficult unless the user places himself in a precise location within the room under the fixture to be controlled.

A similar system is sold by the Silvertown Hitech Corporation, where the infrared receiver is mounted to the louvers of a fluorescent fixture. In this system, the infrared receiver is specifically adapted to be mounted to a specific fluorescent fixture, and it tends to block light output from the fixture and also makes lamp replacement more difficult.

A further system is sold by Matsushita wherein a single transmitter can be used for independent control of two or more different receivers. This is achieved by adjusting a switch on the transmitter to correspond to a switch setting which has been previously set at the receiver corresponding to the fixture desired to be controlled. For example, fixture A could be controlled when the switch is in position 1 and fixture B could be controlled when the switch is in position 2. In this system, the user must remember which fixture corresponds to which switch position, i.e., A corresponds to 1 and B corresponds to 2.

It is easy for the user to forget and become confused, particularly when there are three or four fixtures controlled by three or four switch positions. This is an undesirable situation. Further, there is a practical limitation on the number of switch positions which can be provided and the number of fixtures in a large room will exceed this. Additionally, there is a great deal of work in programming and reprogramming the receivers for a large number, for example, 20 fixtures.

In comparison, in the system of the invention of co-pending application Ser. No. 08/407,696, the transmitter is simply pointed at the receiver in the fixture which it is desired to control. This is simple, unambiguous and transparently ergonomic. Further, it does not require any preprogramming or reprogramming of the receivers.

It is also known to use an infrared transmitter for the control of a wall box mounted dimmer, such as the "Grafik Eye" Preset Dimming Control sold by Lutron Electronics Co., Inc., the assignee of the present invention. Also see U.S. Pat. No. 5,191,265 which describes such transmitters. The Grafik Eye Dimmer Control system provides for the remote control of fixtures and other lamps by a control circuit located at the wall box which controls those fixtures and lamps. An infrared transmitter aimed at the wall box housing produces a beam which contains information to turn on and off and to set the light dimming level of the fixtures being controlled to one of a plurality of preset levels, or to continuously increase or decrease the light level. Other similar systems are sold by Lutron Electronics Co., Inc. under the trademark RanaX-Wireless Dimming Control System and Spacer Personal space light control. Such systems are not intended to control individual ceiling fixtures in a room independently of other closely spaced fixtures (those fixtures spaced up to about two feet apart).

The invention of co-pending application Ser. No. 08/407,696 solved the problems referred to above. Thus, in accordance with that invention, each fixture to be controlled has a radiation receiver and ballast control circuit mounted in the interior of the fixture housing and is wired internally of the fixture housing to a dimming ballast, in the case of a fluorescent fixture. In the case of an incandescent fixture, each light to be controlled has a radiation receiver and dimmer, which is connected to the lamp to be controlled. A small opening in the fixture housing allows optical communication with the radiation receiver and is easily illuminated from substantially any location in the room containing the fixtures. A narrow beam radiation transmitter with a beam angle, for example, of about 8° is employed to illuminate the radiation-receiving opening in the fixture without illuminating the fixtures spaced greater than about two feet from the fixture to be controlled. For rooms about thirty feet by thirty feet in area and ten feet high, fixtures two feet apart can be easily discriminated between one another. For larger spaces, the user can reposition himself to discriminate between closely spaced fixtures.

The receiver of the above co-pending application contains a printed circuit board mounted in an area of a typical fixture box. A radiation sensor is mounted on the printed circuit board and faces an open side of the box which is covered by a yoke. The radiation employed is preferably infrared light and the yoke has an infrared transparent portion to allow infrared radiation to reach the radiation sensor. Narrowly focused, high frequency ultrasound could also be employed.

In addition, a laser beam with information encoded on it in known manner could be used, with the laser beam being spread by optical means such as a divergent lens. In the case of a visible beam, this would produce a beam like a flashlight pointer which would aid in pointing the transmitter at the receiver.

Finally, narrowly focused radio frequency waves could be used. These could be emitted from a parabolic reflector on the transmitter, using a parabolic reflector of approximately 4.3 cm in diameter and a frequency of 60 GHz. The beam spread would be approximately 8°. The opening used for optical signals would, of course, be modified if radio frequency waves are used.

To install the receiver structure of application Ser. No. 08/407,696, a mounting structure is provided whereby a plastic hook or loop type fastener surface is fixed to the yoke and the cooperating hook or loop type surface is attached to the interior of the fixture, preferably on the wire way cover within the fixture. All wires can then be interconnected within the fixture wire-way. An opening is formed in the wire-way cover of the fixture and optically communicates with the radiation receiver within the receiver housing. The receiver housing is easily located within the wire-way housing to communicate with the opening in the wire-way cover and is then pressed in place. An optical lens insert can be installed in the yoke to assist in focusing input radiation on the radiation receiver sensing element. This lens insert can be interchangeable and different lens inserts can be designed to have different angles of acceptance of input radiation.

The lens protrudes slightly through an opening in the fixture housing to receive infrared radiation from the transmitter. The transmitter is an infrared transmitter of the type employed in the Lutron Grafik Eye system previously identified for use with wall box dimmer systems. The Grafik Eye transmitter is an infrared transmitter which can transmit twelve different code combinations. The transmitter is operable to transmit a beam angle of about 8° and can, therefore, selectively illuminate relatively closely spaced ceiling fixtures. Depending on the code received, a selected fixture can be dimmed to one of a plurality of preset dim conditions, or can be dimmed continuously up or down. Thus, the transmitter can accomplish raise/lower, presets, low/high end trim and the like. Alternatively, a transmitter with a movable slide or rotary actuator could be used to provide continuous dimming control.

This structure has a major advantage in retrofitting an existing installation. Thus, it is only necessary to drill a small opening in the wire-way cover, and mount an infrared receiver/ballast controller to the wire-way cover in line with the opening within the wire-way cover. Light dimming ballasts are then mounted within the fixture wire-way and are interconnected with the receiver/ballast controller within the fixture wire-way without need for external wiring. The wire-way cover with receiver/ballast controller attached is then reinstalled in the fixture.

The previously described invention of application Ser. No. 08/407,696 is also disclosed for use with a large variety of existing fixtures and can also be used with external switches and dimming circuits. Photocells, occupancy sensors, time clocks, central relay panels and other inputs can also be used with the system. Furthermore, that invention made it possible for a single receiver to operate any desired number of ballasts.

The primary application of the invention of application Ser. No. 08/407,696 is in large open plan office areas illuminated by overhead fluorescent fixtures, particularly where video display units (e.g., personal computers) are used. However, that invention also has applications in areas which are used for audio visual presentations, in hospitals and elder care facilities, in manufacturing areas and in control rooms, the control of security lighting, either indoor or outdoor, and to reduce lighting levels for energy conservation.

A further application of the prior invention is in-wet or damp locations where normal wall controls cannot be used due to the danger of electric shock or in areas with hazardous atmospheres where there is a danger of explosion if a line voltage wall control is operated and causes a spark. In these cases, the receiver can be located in a protected fixture and the lights controlled by the low voltage hand-held remote control transmitter.

The prior invention was described with respect to the control of light levels. However, the output from the receiver could be adapted in known manner to control motor speed and/or position such as the position of the motors in window shade control systems. The output from the receiver could further be adapted to control other types of actuators such as solenoids.

The above-described invention of application Ser. No. 08/407,696 performs very well. However, it has been found that the system was directionally sensitive due to shadowing and unpredictable reflections of the radiation by the light fixture baffle or lens. It was also found that the system was sensitive to sources of infrared radiation other than the infrared signal of the remote transmitter, and further, that the system was slow in responding to a valid infrared signal from the transmitter because the receiver was waiting for a signal while in an "insensitive" state.

A further problem with the system of application Ser. No. 08/407,696 was that an expensive fiber optic cable was required when the end of the infrared receiver was removed some distance, for example, up to 24 inches from the infrared receiver housing.

Prior co-pending application Ser. No. 08/585,111 described above, addressed these issues. In that application, a radiation receiver is described extending from a housing enclosing a radiation responsive circuit. The receiver comprises an elongated radiation conductor having a length which is sufficiently elongated and that extends from a housing for an infrared responsive control circuit for the electrical lighting fixture to a free end which is flush with or penetrates beyond the plane of the fixture reflective surface or lens cover. The free end is disposed so as to receive the control infrared radiation and the conductor conducts it to the receiver to effectuate control.

The radiation receiver described therein may take various forms including a thin rigid molded plastic such as an acrylic or polycarbonate radiation conductive rod. In another embodiment, the radiation receiver may have a portion thereof covered with an infrared shielding material or structure which blocks lamp infrared and thus improves the signal to noise ratio, thus giving greater reception range.

In addition, in prior art systems it is known to use conventional but expensive fiber optical cables as light pipes to conduct infrared energy from a receiving end of the light pipe to an infrared responsive circuit component which controls the lighting fixture.

Also described in the above co-pending application Ser. No. 08/585,111 is the use of an inexpensive elongated "end light" fiber optics conductor.

In another embodiment described in the above co-pending application, the infrared receiving conductor comprises a flexible end light fiber optics conductor and in particular, a gel core surrounded by a light reflecting layer and by an outermost ultraviolet opaque layer.

In another embodiment, the radiation receiving elongated conductor is a semi-rigid optical structure that can be bent by hand to place the free end at any desired location for best reception of an infrared signal. It includes a semi-flexible wire which is positioned under a shielding but externally of the infrared energy transmissive conductor. The wire is semi-flexible and the entire assembly including the shield and the infrared transmissive conductor can be bent to any desired shape by hand. The assembly is still rigid enough that when the bending force is removed, the assembly is self supporting and retains the desired shape in the manner of a pipe cleaner.

In another embodiment of the light transmissive member described in the above co-pending application the infrared transmissive structure comprises a semi-rigid optical structure made of, for example, an acrylic plastic wherein the polymerization process has been shortened to allow the conductor to be flexible and also to maintain a given shape without the need for a semi-flexible wire around the periphery thereof.

Also described in application Ser. No. 08/585,111 is a method of decreasing the sensitivity of the infrared receiving circuit to noise infrared energy emitted by the controlled lighting fixtures themselves which may interfere with the control of the lamps by the control infrared energy.

The infrared transmissive conductors of the above-identified co-pending application Ser. No. 08/585,111 are acceptable and work well. However, it has been found that even more simplified and more efficient infrared energy transmitting members can be devised. Further, improvements in the range at which the infrared energy responsive control circuits can operate from the source of infrared energy are also desirable.

SUMMARY OF THE INVENTION

It is an object of the present invention to provide an infrared energy transmissive member for conducting infrared energy from a first end of the infrared transmissive member to a second end of the infrared transmissive member disposed adjacent an infrared responsive circuit component.

It is a further object of the present invention is to provide a radiation receiver for receiving and processing an infrared signal.

Yet still another object of the present invention is to provide an infrared energy transmissive member which has significant advantages over prior art infrared energy transmissive members including increased range.

Yet still a further object of the present invention is to provide an infrared energy transmissive member which can be bent into a desired shape to go around, e.g. obstacles.

It is yet still a further object of the present invention to provide an inexpensive infrared energy transmissive member.

Yet still a further object of the present invention is to provide an infrared energy transmissive member which can be bent into a desired shape and which has a simplified structure.

It is yet still a further object of the present invention to provide an infrared energy transmissive member for conducting infrared energy from a first end of the member to the second end and which is conveniently secured in a housing containing an infrared responsive circuit component which is disposed adjacent the second end of the member.

It is yet still another object of the invention to provide an infrared responsive system for controlling an electrical appliance such as a lighting fixture or electrically controlled window treatment such as a motor driven window blind.

The above and other objects of the present invention are achieved by an infrared energy transmissive member for conducting infrared energy from a first end of the infrared transmissive member to a second end disposed adjacent an infrared responsive circuit component, the member comprising a flexible hollow plastic tube.

Preferably, the infrared transmissive member comprises an ester based polyurethane tube, e.g., made of Tygothane® manufactured by Norton Plastics of Akron, Ohio. Such an infrared transmissive member has been found experimentally to have a range approximately 25% greater than ordinary'plastic tubing made of PVC (polyvinyl chloride) when measured according to the experimental arrangement described herein below.

A PVC tube can also be used as the infrared transmissive member. However, it has been found that, due to its characteristics, an ester based polyurethane tube provides significantly increased range.

Even more preferably, the invention comprises an ester based polyurethane clear plastic tube having a malleable or bendable rod contained in the interior hollow space of the tubing. Preferably, the tubing is sized such that the inner diameter is slightly larger than the outer diameter of the malleable rod.

In this way, a very simple structure can be achieved for transmitting infrared energy to an infrared responsive circuit component and yet which can be bent to the desired configuration to convey the infrared energy to the circuit component.

It has been found that clear plastic ester based polyurethane tubing having a 1/16 inch inside diameter (ID) and a 1/4 inch outside diameter (OD) provides an-excellent infrared energy conductor for conveying infrared energy to the infrared responsive circuit component.

The bendable wire within the inner diameter of the plastic tubing which serves to allow the tubing to be configured into a desired shape also provides a convenient means for fastening the tubing in a housing containing the infrared responsive circuit component and which may also contain the control circuit for controlling the light intensity of the electrical fixture.

The above and other objects of the present invention are also achieved by an infrared energy transmissive member having a first end and a second end for transmitting infrared energy from the first end to the second end, the second end being adjacent an infrared responsive circuit component, the member comprising an infrared transmissive flexible plastic hollow tube, the hollow tube having an inner surface and an outer surface, the inner surface having an average RMS surface roughness of about 1 to 10 microinches and preferably 1 to 4 microinches of the outer surface.

Preferably, the range of the surface roughness of the outer surface is between approximately 1 and 10 microinches RMS.

The above and other objects of the present invention are also achieved by a radiation receiver for receiving and processing an infrared signal, said radiation receiver comprising an infrared responsive circuit component; a control circuit coupled to said infrared responsive circuit component for producing an output related to signal information contained in the infrared signal received by said radiation receiver; a housing for said infrared responsive circuit component and said control circuit; and an infrared conducting member comprising a hollow flexible tube extending into said housing and supported by said housing at one end and having said one end disposed adjacent said infrared responsive circuit component and a free end disposed exteriorly of said housing for the reception of said infrared signal.

The above and other objects of the present invention are also achieved by an infrared energy transmissive member for conducting infrared energy from a first end of the member to a second end disposed adjacent an infrared responsive circuit component comprising an infrared energy transmissive flexible plastic hollow tube having an outer diameter and an inner diameter; and a malleable rod disposed coaxially in said hollow plastic tube, the malleable rod being bendable to enable bending of said plastic tube into a desired configuration; the malleable rod having a specified diameter, the inner diameter of the hollow plastic tube being equal to or greater than the diameter of said malleable rod.

The above and other objects of the invention are also achieved by an infrared energy transmissive member for conducting infrared energy from a first end of the infrared energy transmissive member to a second end disposed adjacent an infrared responsive circuit component, the member comprising a flexible hollow plastic tube, a bend being provided in the tube, the bend being provided in a location adapted to be exposed to infrared energy for controlling the infrared responsive circuit component, the bend coupling infrared energy into the tube.

The above and other objects of the invention are also achieved by a radiation receiver for receiving and processing an infrared signal for controlling the position of a window treatment, said radiation receiver comprising, an infrared responsive circuit component, a control circuit coupled to said infrared responsive circuit component for producing an output related to signal information contained in the infrared signal received by said radiation receiver and for controlling the position of a window treatment, a housing for said infrared responsive circuit component and said control circuit, and an infrared conducting member comprising a hollow flexible tube extending into said housing and supported by said housing at one end and having said one end disposed adjacent said infrared responsive circuit component and a free end disposed exteriorly of said housing for the reception of said infrared signal.

Other features and advantages of the present invention will be described in the following detailed description.

BRIEF DESCRIPTION OF THE DRAWINGS

The invention will now be described in greater detail in the following detailed description with reference to the drawings in which:

FIG. 1 is a top plan view of an infrared energy responsive circuit contained within a housing and having an infrared energy transmissive member for conveying infrared energy from a free end to a circuit component contained within the housing attached thereto;

FIG. 2 is a perspective view of the infrared energy responsive circuit shown in FIG. 1;

FIG. 9 shows an alternative end cap for the free end of the infrared energy transmissive member which helps in focusing and/or filtering incoming infrared radiation;

DETAILED DESCRIPTION OF EMBODIMENTS OF THE INVENTION

Figure 3:
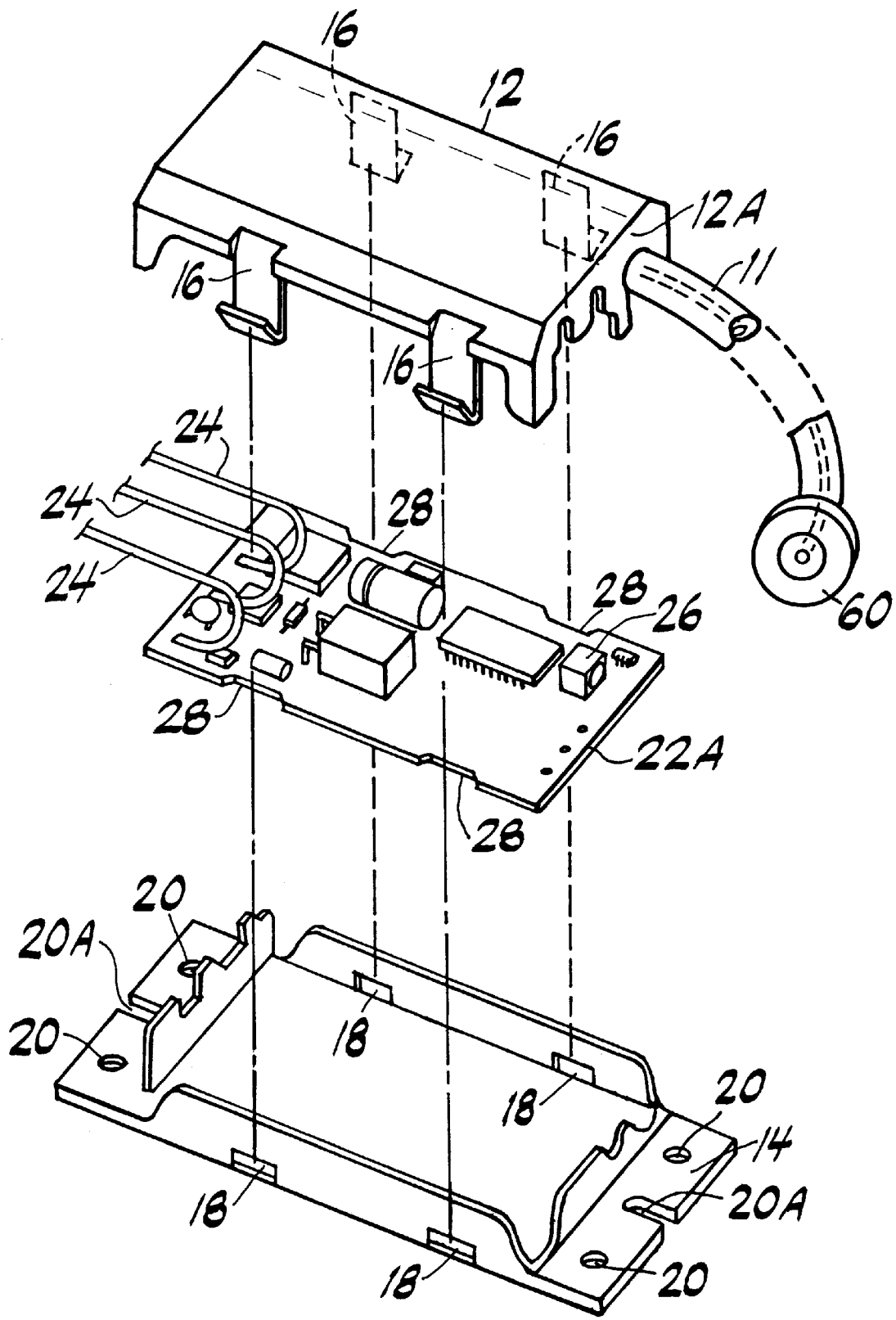
FIG. 3 is an exploded perspective view of the infrared energy responsive circuit of FIG. 2.

With reference now to the drawings, reference numeral 10 generally denotes the housing for an infrared energy responsive circuit for controlling an electrical fixture, for example, an electrical lamp such as a fluorescent lamp.

Figure 14:
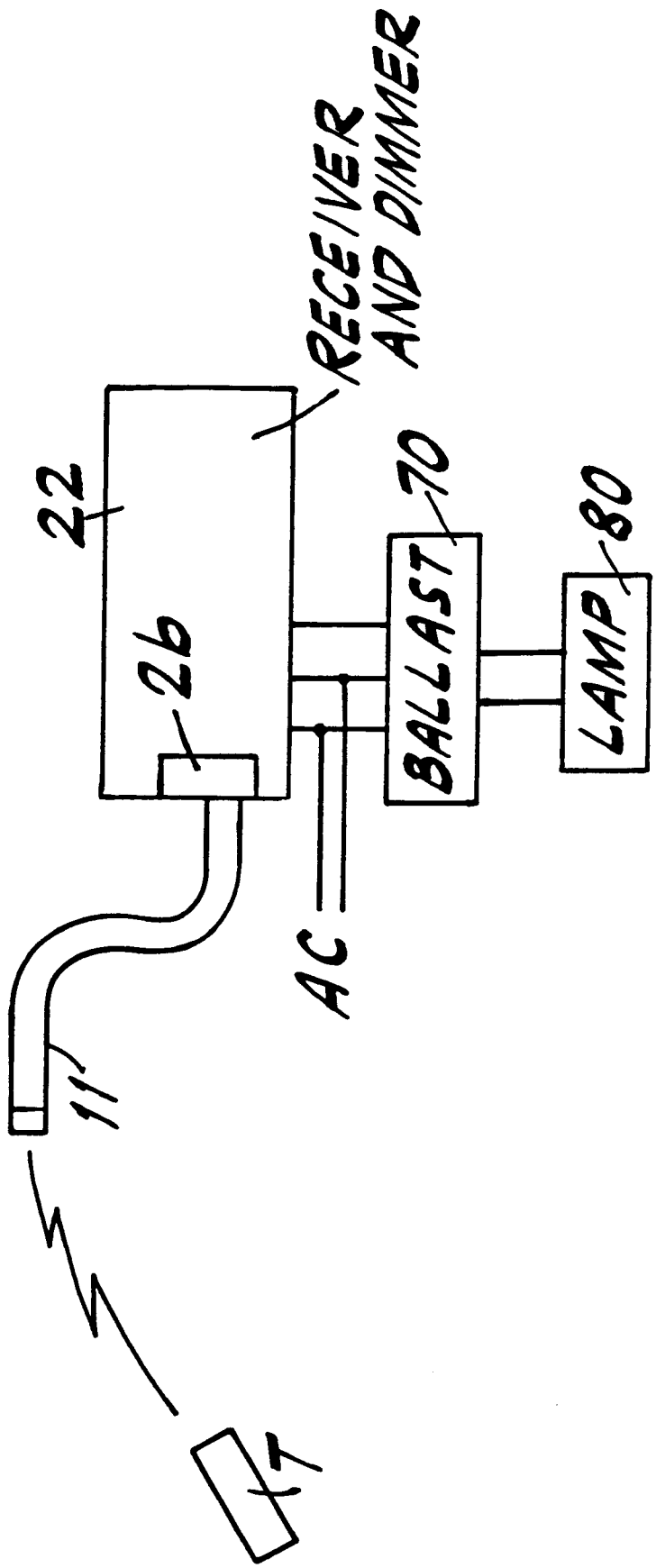
FIG. 14 is a simplified block diagram of an infrared responsive system for remotely controlling the intensity of a fluorescent lamp.

FIG. 14 shows a block diagram of a system for remotely controlling the intensity of a fluorescent lamp. This general type of system is described in detail in co-pending application Ser. No. 08/407,696. The system includes a remote infrared hand-held control transmitter T, an infrared receiving transmissive conductor 11, a receiver/dimming circuit 22 containing an infrared responsive circuit component 26, an electronic lamp ballast 70 and the fluorescent lamp or lamps 80.

FIG. 1 generally shows the housing for an infrared energy controlled electronic dimmer for a fluorescent lamp, for example, the dimmer described in the above co-pending application Ser. No. 08/407,696. The housing 10 is made of two pieces which may snap together as shown in FIG. 3. The two pieces comprise an upper housing portion 12 and a lower housing portion 14. The upper housing portion 12 may have suitable vertically extending snap fasteners 16 which are received in suitable slots 18 in the lower housing 14. The lower housing 14 includes suitable fastening holes and/or slots 20, 20A, as shown, for fastening the electronic dimmer circuit into the housing of an electrical fixture.

The housing 10 comprising the two portions 12 and 14 contains therein an electronic dimming circuit 22 disposed on a circuit board 22A generally shown in FIG. 3 and described in the-above co-pending application. The electronic dimming circuit may be of the type sold by Lutron Electronics Company, Inc. under the brand name Personna. This design electronic dimmer has three power/control wires 24 as shown in the drawing figures. Other dimmer circuits can be used having a different number of power/control wires, e.g. four. The electronic dimming circuit includes an infrared responsive circuit component 26, such as an infrared receiving diode (Preamp), disposed on a circuit board 22A such that when the circuit board 22A is received in the housing portion 12, the infrared responsive circuit component 26 is disposed adjacent the end 40 of the infrared transmissive member 11, as shown in phantom view in the upper right hand portion of the housing of FIG. 1. Preferably, the circuit board 22A has notches 28 provided therein which allow the snap fasteners 16 to pass by the circuit board 22A so that they can be received in the slots 18 provided in the lower housing.

According to the invention, the infrared energy transmissive member 11 comprises a suitable length of clear plastic tubing and, most preferably, an ester based polyurethane tubing. Other material can be used, such as PVC. It has been found through experiment that, most preferably, tubing made of an ester based polyurethane provides significant advantages over tubing made of PVC and over prior art energy transmissive conductors.

Although the infrared energy transmissive member may be made of any suitable plastic, such as PVC, it has been found that an ester based polyurethane tubing such as Tygothane® tubing made by Norton Plastics of Akron, Ohio provides best results. In particular, an ester based polyurethane tubing such as Tygothane® has been found to increase the range of infrared responsive devices by about 25% over devices using polyvinyl chloride (PVC) tubing as the infrared energy transmissive conductor.

The member 11 may also include a cover comprising a low refractive index material such as teflon.

It has been found that the ester based polyurethane tubing sold under the trademark Tygothane has a superior surface finish to conventional plastic PVC tubing. For example, as shown in Table 1 below, the RMS inside surface roughness of a sample of Tygothane® tubing experimentally was determined to be approximately 2.379 microinches. The exterior RMS surface roughness, was about 7.288 microinches for a sample of the same type tubing. In contrast, the RMS inside surface roughness of a sample of PVC tubing was 11.046 microinches and the exterior RMS surface roughness was measured at 9.312 microinches.

Preferably, the RMS surface roughness of both the inside surface and the exterior surface is between 1 and 10 microinches. Even more preferably, the RMS surface roughness of the inside surface is between 1 and 4 microinches.

It is believed that the increased smoothness of the Tygothane® tubing results in increased efficiency of transmission of infrared energy through the interior volume of the tubing between the inner and outer diameters from the receiving end to the end adjacent the infrared energy responsive circuit component.

TABLE 1

|  | ($\mu$ in) RMS Surface Roughness (1) Rq | ($\mu$ in) Average Deviation (2) Ra | ($\mu$ in) Peak to Valley (3) Rt |
|---|---|---|---|
| TYGOTHANE ® |  |  |  |
| Inside surface | 2.379 | 1.897 | 15.869 |
| Exterior surface | 7.288 | 5.293 | *122.448 |
| PVC |  |  |  |
| Inside surface | 11.046 | 8.728 | 81.099 |
| Exterior surface | 9.312 | 7.772 | 60.155 |

[1]Root mean square (RMS) surface roughness is the overall surface roughness and is believed to be the most significant value.
[2]Average deviation of surface profile (Variability)
[3]Peak-to-valley (P–V) extreme height to depth of the surface profile.
*This value is not normal. It is elevated because of an isolated peak. See FIG. 11.

It is believed that any infrared energy transmissive tube with a RMS surface roughness of 1–10$\mu$ in will give superior range as compared to PVC.

Figure 4:
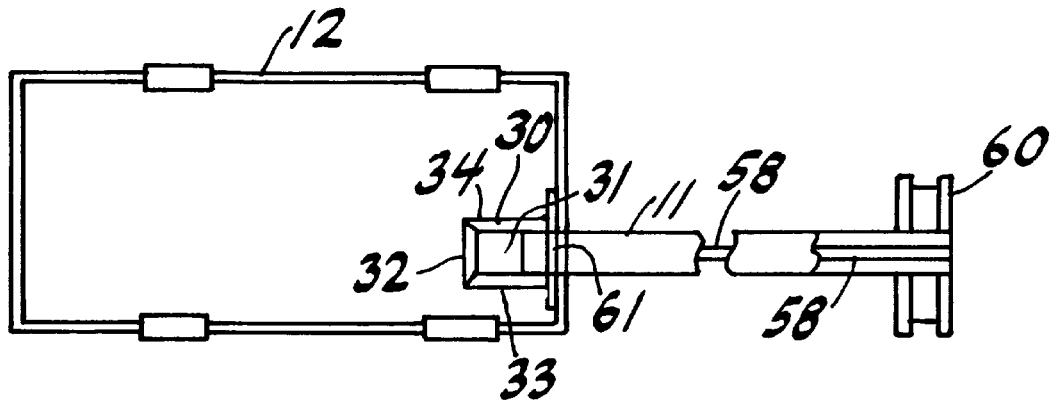
FIG. 4 is a plan view of the underside of the top housing cover of the infrared energy responsive circuit shown in FIG. 3.

As shown in FIG. 4, the upper housing 12 of the infrared energy responsive circuit may include an internal housing 30 which is closed on a top side 31 by the housing 12 and on three other sides 32, 33 and 34. See, in particular, FIG. 8 which shows details of the inner housing 30.

When the circuit board 22A is affixed to the housing 12, the infrared energy responsive circuit component 26 is received within the interior volume defined by the walls 31, 32, 33 and 34. The second end 40 of the infrared energy transmissive conductor 11 is disposed so that the end 40 is adjacent the infrared energy receiving surface of the infrared energy responsive circuit component 26. Preferably, the inner diameter of the tubing 11 is such that a portion of the tubing between the outer and inner diameters overlies the receiving surface of the infrared energy responsive circuit component 26.

Figure 5:
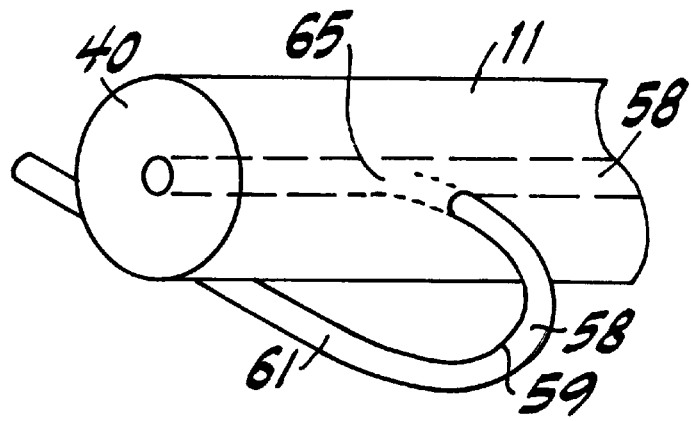
FIG. 5 shows a detail of the infrared energy transmissive member at the second end disposed adjacent the infrared energy responsive circuit component showing how a flexible rod is contained within the inner diameter of the plastic tube serving as the transmissive member and allows for securement of the plastic tube within the housing of FIG. 4.
Figure 6:
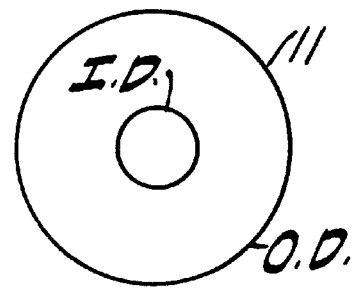
FIG. 6 shows an end detail of the plastic tubing comprising the infrared energy transmissive member showing the inner diameter and outer diameter of the tubing.
Figure 8:
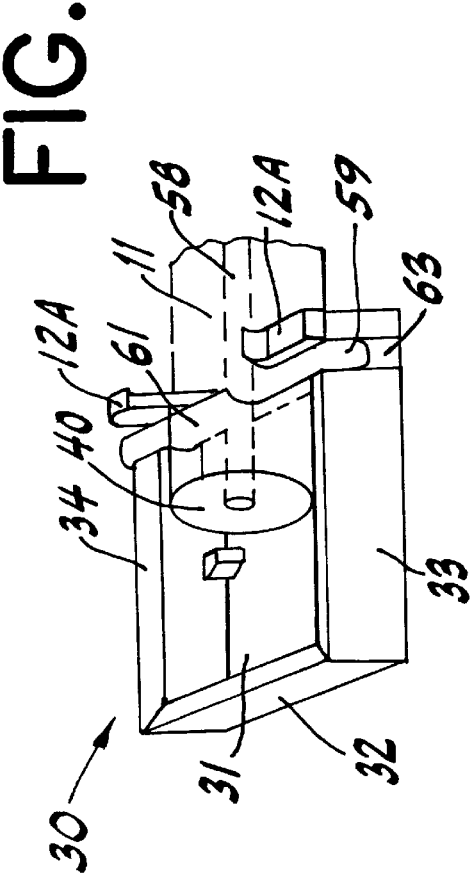
FIG. 8 shows details of the securement of the second end of the infrared energy transmissive member according to the invention into the housing for the infrared energy responsive circuit adjacent the infrared energy responsive circuit component of the infrared energy responsive circuit.

As shown in FIGS. 4, 5 and 8, preferably a malleable metal rod 58 is provided within the tubing 11. Preferably, the tubing inner diameter ID, shown in FIG. 6, is sized so that it is slightly larger than the diameter of the malleable rod 58. Alternatively, the inner diameter ID of the plastic tubing may be sized such that it fits snugly around the metal rod 58. An aim is to maximize the cross-sectional area between the outer diameter and inner diameter of the plastic tubing 11 which is disposed adjacent the infrared energy responsive surface of the infrared energy responsive circuit component 26. However, it has been found that as long as only a small portion of the area between the OD and ID of the tubing overlies the receiving surface of the infrared energy responsive circuit component that the systems described will operate adequately.

It has been found that the range at which signals can be received is the same whether the rod is present or not present.

According to the preferred embodiment of the invention, the inner diameter of the plastic tubing 11 is approximately 1/16 inch and the outer diameter is approximately 1/4 inch. Conventional plastic tubing is typically sized with an inner diameter of approximately 1/8 inch and an outer diameter of approximately 1/4 inch. However, this is not crucial. The invention will operate with either size inner diameter or another size inner diameter. Also, different outer diameter sizes can be used.

Figure 17:
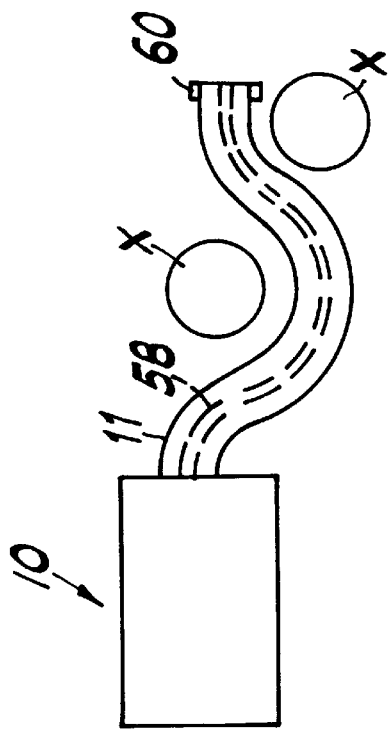
FIG. 17 shows how the invention allows bending the infrared transmissive member around obstacles.

As described, the malleable rod 58 allows the infrared energy transmissive conductor 11 to be bent into a desired configuration. See FIG. 17, for example, which shows illustratively how the conductor 11 can be bent around obstacles X. The malleable rod 58 can be made of any suitable bendable material, but preferably is a bendable metal such as copper, aluminum or steel. The type of material is not crucial as long as the malleable rod is easily bendable, without breaking, to a desired configuration and can maintain the configuration into which it is shaped. This allows the energy transmissive member 11 to be bent around obstacles and to be directed such that it is less affected by infrared energy from the controlled lamps or other lamps nearby and so that it can be disposed in a location where it is most likely to receive infrared energy from the remote control transmitter T.

It has been found that bends in the tube do not significantly reduce the signal range.

As shown in the drawing figures, the free end of the infrared energy transmissive conductor 11 may have a suitable end cap, such as a spool shaped decorative end cap 60.

FIG. 9 shows an alternative end cap 60A made of a suitable plastic material. It may be tinted an appropriate color, e.g., red, to provide a selected filter characteristic, i.e., to allow transmission of infrared energy and inhibit the transmission of other wavelengths. The end cap 60A has an appropriately sized inner diameter to fit snugly over the outer diameter of tubing 11.

Furthermore, end cap 60A may be a Fresnel type lens to focus the infrared energy on the free end of the infrared conductor 11, thereby assisting in reception.

As shown in FIG. 5, the malleable rod 58 allows the second end 40 which is disposed adjacent the infrared energy responsive circuit component 20 to be secured into the housing portion 12. The malleable rod 58 is bent at approximately a 90° angle near the second end as shown at 65 and extends transversely through the plastic tubing. It is then bent approximately 180° as shown at 59 and extends transversely as shown at 61. The transversely bent portion 61 of rod 58 is received in a channel 63 disposed between ends of walls 34 and 33 and end wall housing 12A of upper housing portion 12. This is shown in detail in FIG. 8.

Figure 7:
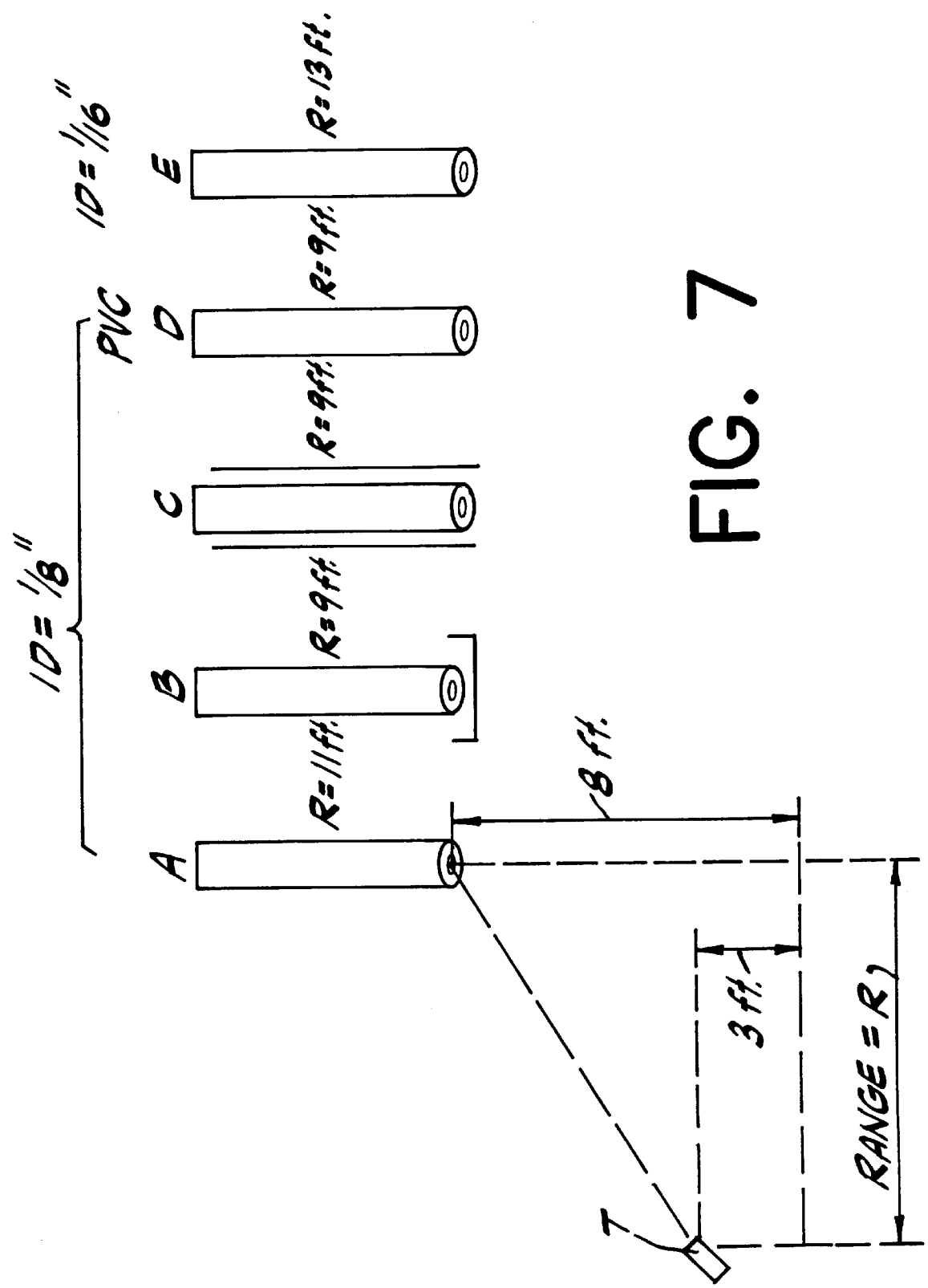
FIG. 7 shows details of an experiment conducted using the infrared energy transmissive member of the present invention and comparing the range of a preferred embodiment of the invention to less preferred embodiments.

FIG. 7 shows the results of an experiment conducted using the tubing according to the present invention. This experiment was conducted with the pieces of tubing mounted within a fixture. The pieces of tubing each had a bend near the end of the tubing adjacent the infrared responsive circuit component. In FIG. 7, examples A, B, and C comprise an infrared energy transmissive plastic tubing comprising an ester based polyurethane tubing having an outer diameter of 1/4 inch and an inner diameter of 1/8 inch. The infrared energy responsive circuit component has a receiving surface diameter of approximate 1/8 inch. Tubing D is a PVC tubing having an outer diameter of 1/4 inch and an inner diameter of 1/8 inch.

Example E comprises an infrared energy transmissive plastic tubing comprising an ester based polyurethane having an outside diameter of 1/4 inch an inner diameter of 1/16 inch.

In each example, the tubing is disposed eight feet, standard ceiling height, from a floor. In each example, the infrared energy transmitter T is disposed approximately three feet from the floor.

In Example A, the horizontal range R is approximately 11 feet.

In Example B, the same tubing as in Example A has been used. In Example B, however an opaque shielding cap has been disposed about the free end of the tubing in Example A. The range is accordingly reduced to approximately nine feet showing that the loss of the infrared energy received at the free end face has a significant impact on the overall range.

In Example C, an opaque shield has been placed around the entire length of the infrared energy transmissive member that extends from the housing 10, leaving the free end exposed. The range is also approximately nine feet. Examples B and C show that the tubing receives infrared energy both through its end and through the side surfaces. These examples also show, however, that the coupling through the side surfaces and the end are not linearly additive.

Example D shows a plastic tubing made of PVC (polyvinyl chloride) that has a range of approximately nine feet.

Example E shows a piece of tubing of the same material as example A, but with an inside diameter of 1/16 inch. Decreasing the inner diameter improved the range from 11 ft to 13 ft.

Figure 10:
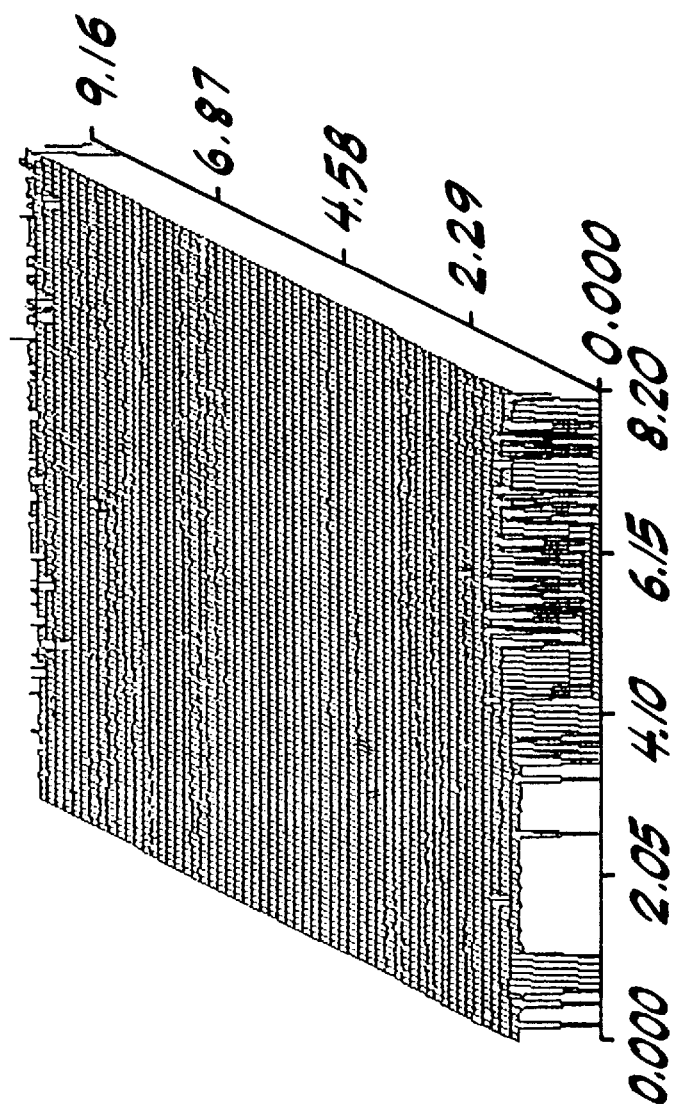
FIG. 10 is a graph showing the inside surface roughness of a sample of an infrared transmissive member made of ester based polyurethane tubing.

FIG. 10 shows the surface roughness of the inner surface of an 8.2 mil×9.16 mil sample of Tygothane® ester based polyurethane plastic tubing. As shown, the interior surface of the sample is quite smooth, having an RMS surface roughness $R_a$ of approximately 1.405 microinches and a standard deviation of approximately 1.132 microinches. The sample has a peak to valley distance of about 16.045 micro inches. The values shown in Table 1 are the average of the values taken in two locations on the same sample.

Figure 11:
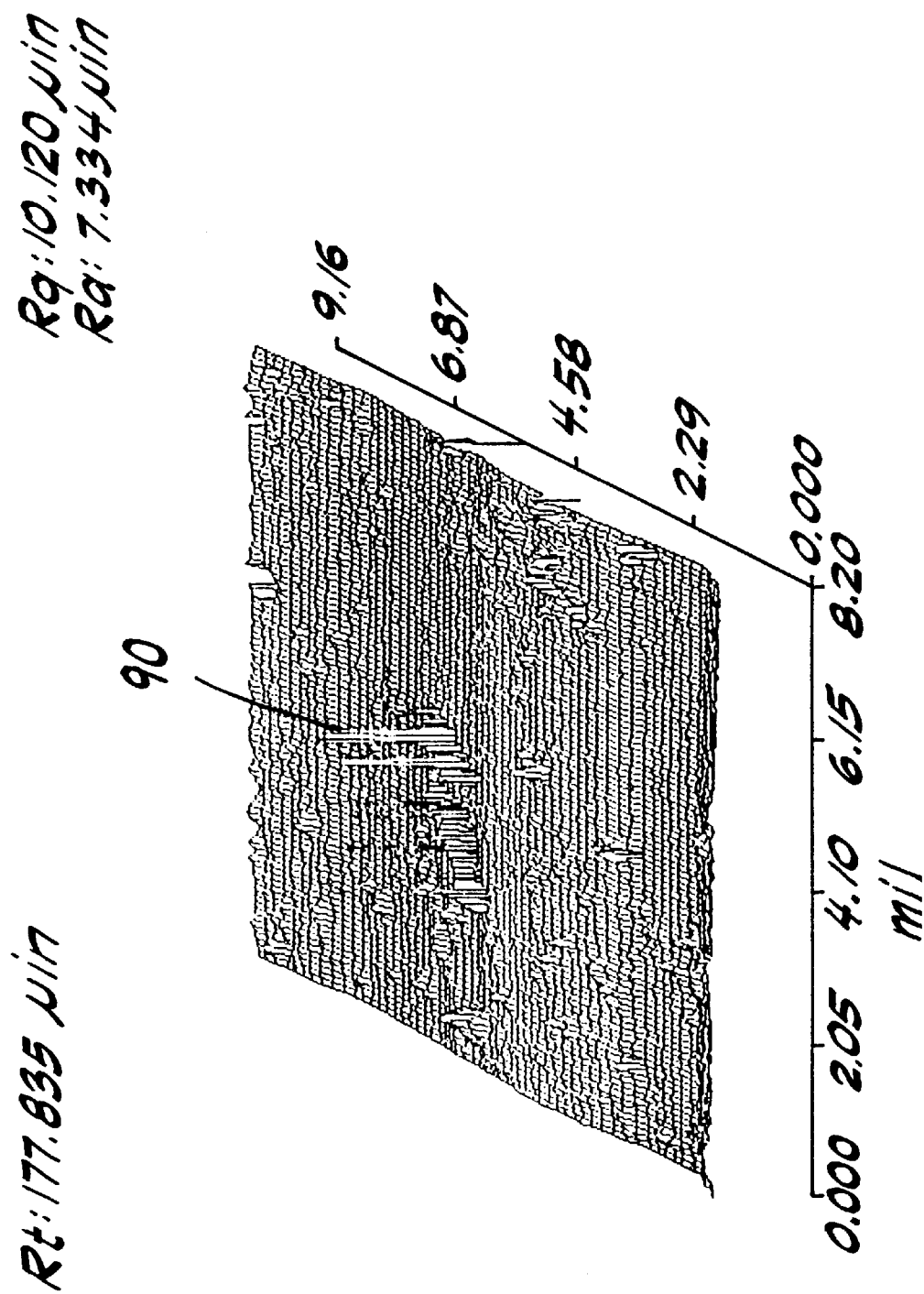
FIG. 11 is a graph showing the outside surface roughness of a sample of an infrared transmissive member made of ester based polyurethane tubing.

FIG. 11 shows the surface roughness of the outside surface of a sample of Tygothane® ester based polyurethane plastic tubing. As shown in FIG. 11, the outer surface is also fairly smooth. Several aberrations are noted, particularly at 90. These are abnormal and account for the high peak-to-valley ratio indicated in Table 1 for the outside surface of the Tygothane® ester based polyurethane tubing. However, on the whole, the surface is quite smooth, as indicated by the relatively low RMS surface roughness $R_a$ of 10.120 microinches and deviation $R_a$ of 7.334 microinches. The values shown in Table 1 are the average of the values taken in two locations on the same sample.

Figure 12:
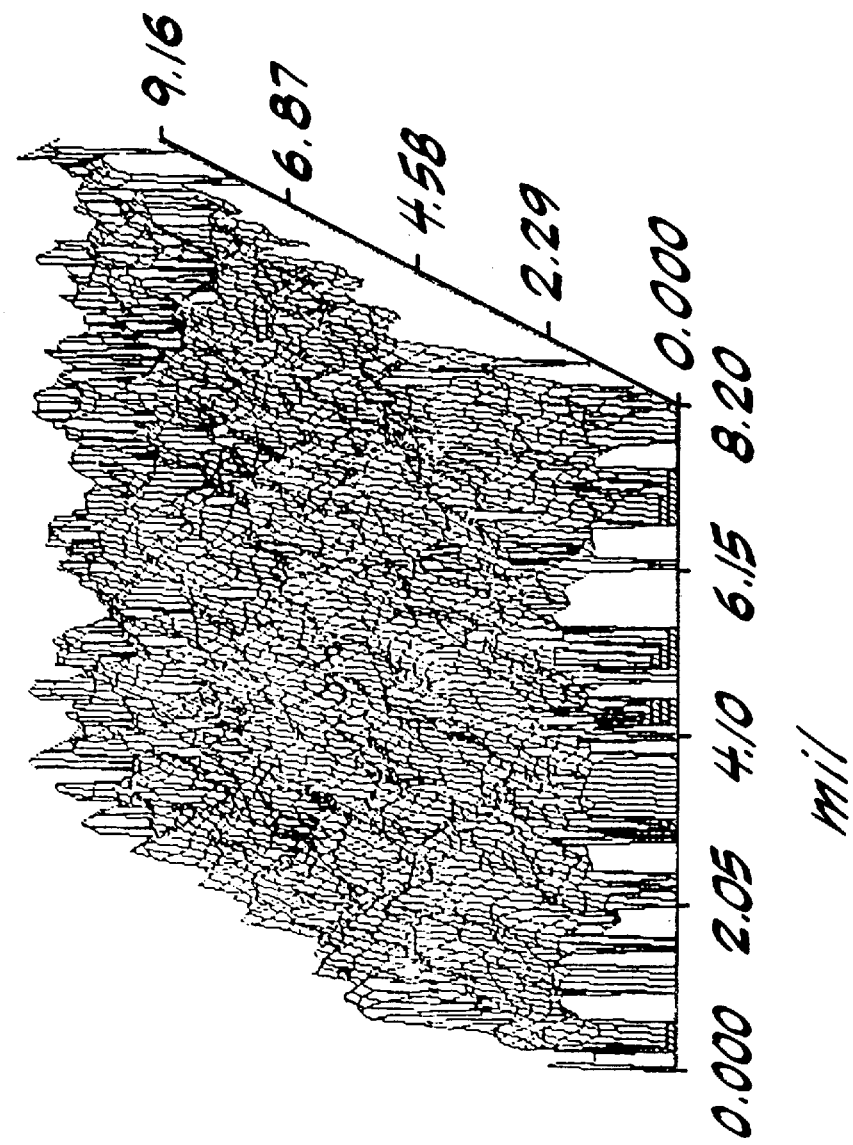
FIG. 12 is a graph of the inside surface roughness of a sample of an infrared transmissive member made of PVC tubing.

FIG. 12 shows the surface roughness of the inner surface of a sample of PVC tubing. As shown, the surface is considerably rougher than the Tygothane® ester based polyurethane tubing shown in FIGS. 10 and 11. It exhibits a high peak-to-valley ratio of approximately 81.099 microinches and a high RMS surface roughness $R_a$ of 11.046 microinches. The deviation in $R_a$ is 8.728 microinches.

Figure 13:
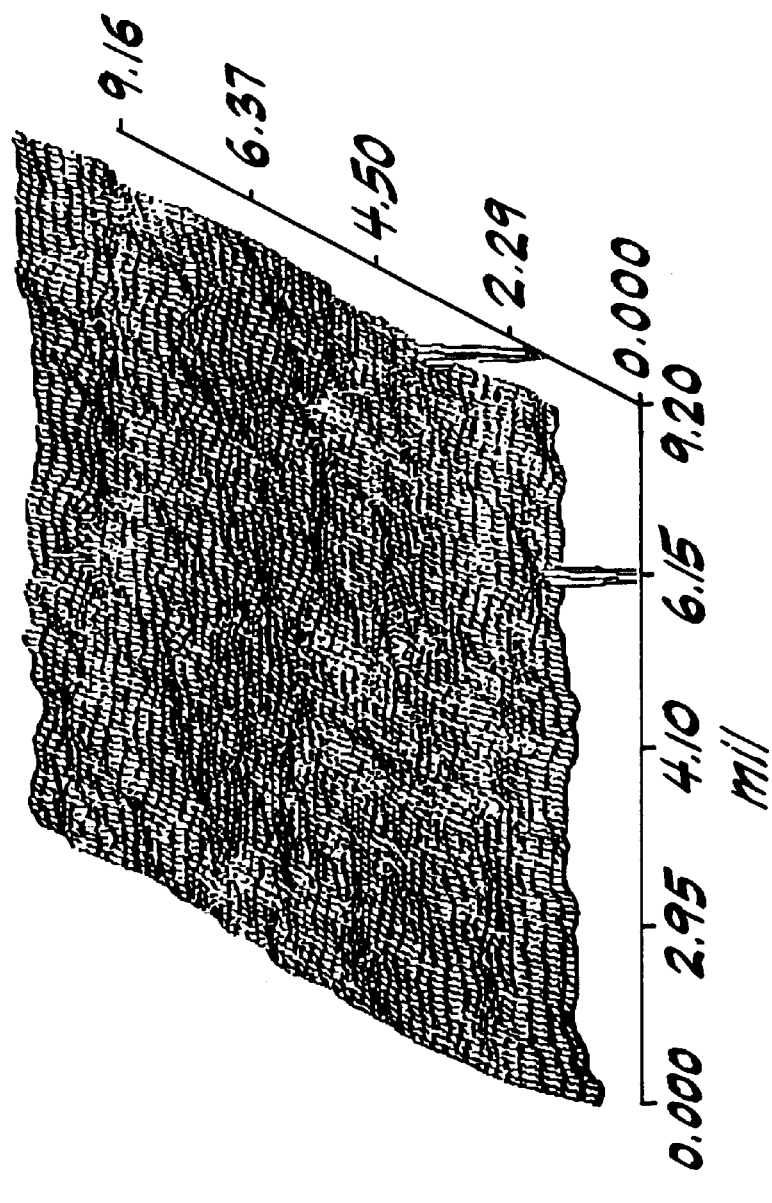
FIG. 13 is a graph of the outside surface roughness of a sample of an infrared transmissive member made of PVC tubing.

FIG. 13 shows the surface roughness of the outside surface of a sample of PVC tubing. As shown, the surface is considerably rougher than the Tygothane® ester based polyurethane tubing shown in FIGS. 10 and 11. It exhibits a high peak-to-valley ratio of approximately 60.155 microinches and a high RMS surface roughness of 11.046 microinches. As is evident from a comparison of FIGS. 12 and 13 with FIGS. 10 and 11, the surface of the sample of PVC is considerably rougher and the roughness extends throughout the surface of the tubing. In contrast, in the samples of the Tygothane® ester based polyurethane tubing, although a high peak-to-valley ratio was recorded for the outer surface, the surfaces are, on the whole, quite smooth and the high peak-to-valley ratio is accounted for by the aberrations indicated at 90. The inner surface of the Tygothane® tubing is, particularly, considerably smoother than the PVC tubing, by about one order of magnitude.

Figure 15:
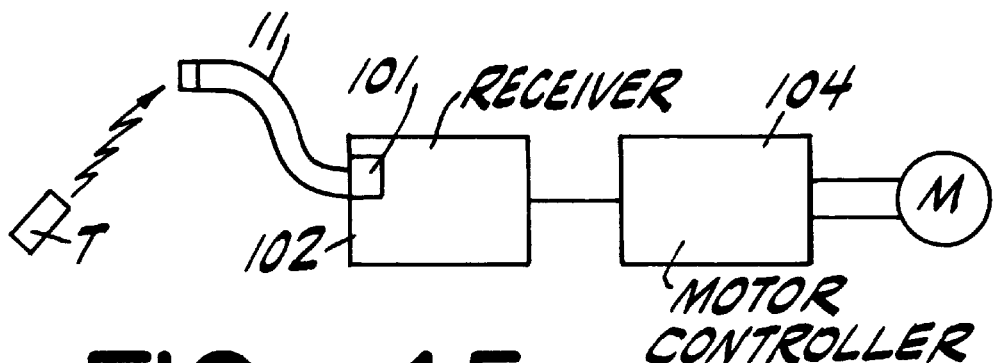
FIG. 15 shows an application of the invention to a motor controller for controlling a window blind or shade.

FIG. 15 shows the block diagram of an infrared responsive system for controlling a motor, for example, a motor M controlling the position and speed of a blind, shade or other window treatment for a window. The infrared transmissive conductor 11 according to the present invention is coupled to an infrared responsive receiver 102 having an infrared responsive component 101. The infrared responsive receiver 102 controls a motor controller 104 which controls the status of motor M, for example, controlling a window shade to go either up or down to a desired location. The infrared transmissive conductor 11 of the present invention is particularly suitable for such an application because in the application to window treatments, it is frequently necessary to have a infrared receiving conductor which can skirt around obstacles such as other window treatments, for example curtains.

In this application, only a small portion of the hollow tube (less than 1 inch) is exposed for receiving incoming radiation signals. This length of exposed tubing has an experimentally tested range of greater than 30 ft when the signal comes in perpendicular to the end surface.

Figure 16:
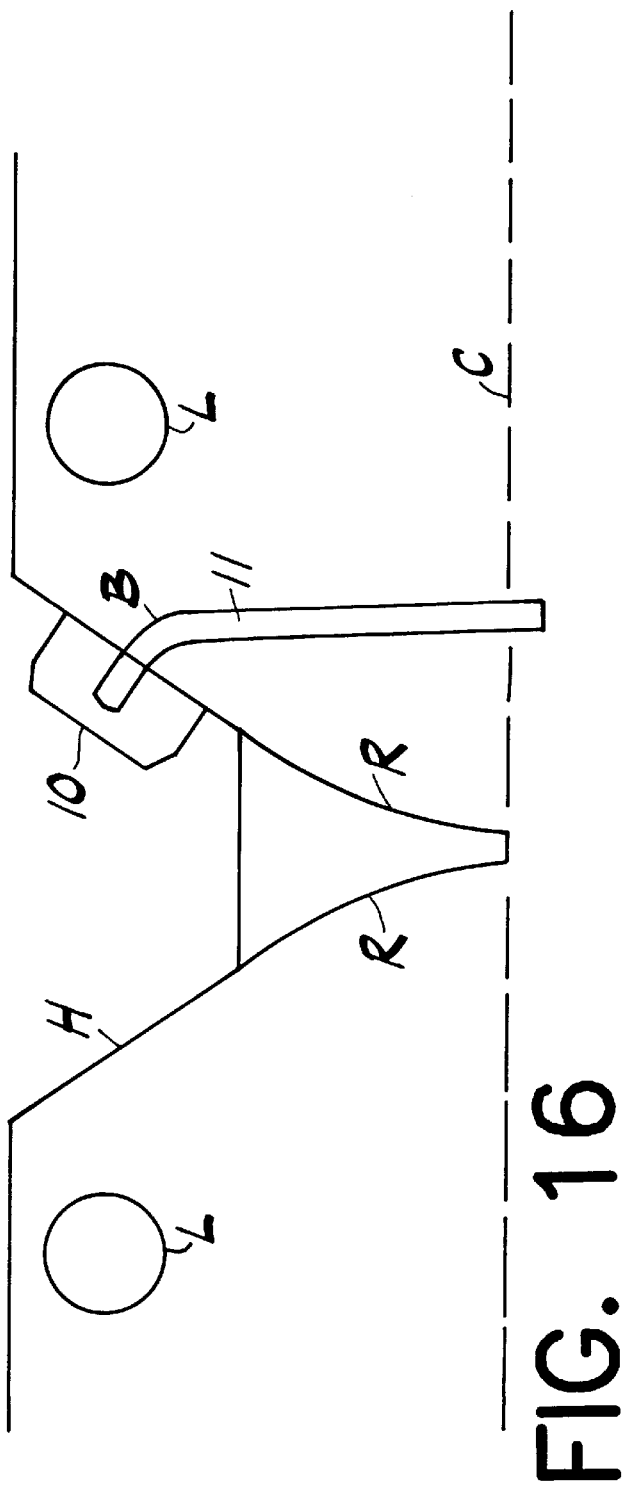
FIG. 16 shows a typical application of the invention in a fluorescent light fixture demonstrating how more efficient coupling of infrared energy can be achieved.

FIG. 16 shows a typical application of the invention to a fluorescent lamp. The lamp fixture housing is indicated at H. The ceiling plane is shown at C. The housing 10 for the infrared responsive circuit 22 is shown fastened to the backside of the housing H. The infrared transmissive member 11 is shown having a bend as indicated at B. The fluorescent lamps are indicated in cross-section at L. Light reflective louvers or grilles are shown at R. It has been discovered that the light transmissive member 11 of the present invention is more effective in coupling infrared energy if the member 11 contains a bend B in the tubing, and particularly a bend B in the tubing at a location where infrared energy will be coupled into the bend. Accordingly, increased range is obtained if a bend B in the tubing 11 is provided at a location where infrared energy will be received and additionally, the bend B should be located at a position as close as possible to the end 40 of the member 11 which is adjacent the infrared responsive component 26. In this way, the infrared energy coupled in to the member 11 at the bend B travels a shorter distance in the tubing and therefore undergoes less attenuation.

It is also useful if infrared reflective surfaces R are provided near the member 11, and particularly near any bend in the member 11, and at the free end of the tubing to allow reflection of infrared energy and thus better coupling into the tubing 11.

Although the use of reflective surfaces R near the member 11 aids in coupling infrared energy, it also has the undesirable affect of coupling in noise infrared energy generated by the lamps L themselves. This can be accounted for by providing in the circuit 22 a sensitivity changing circuit of the type described in co-pending application Ser. No. 08/585,111, which reduces sensitivity to noise infrared and increases sensitivity to control infrared from the transmitter T.

Figure 18:
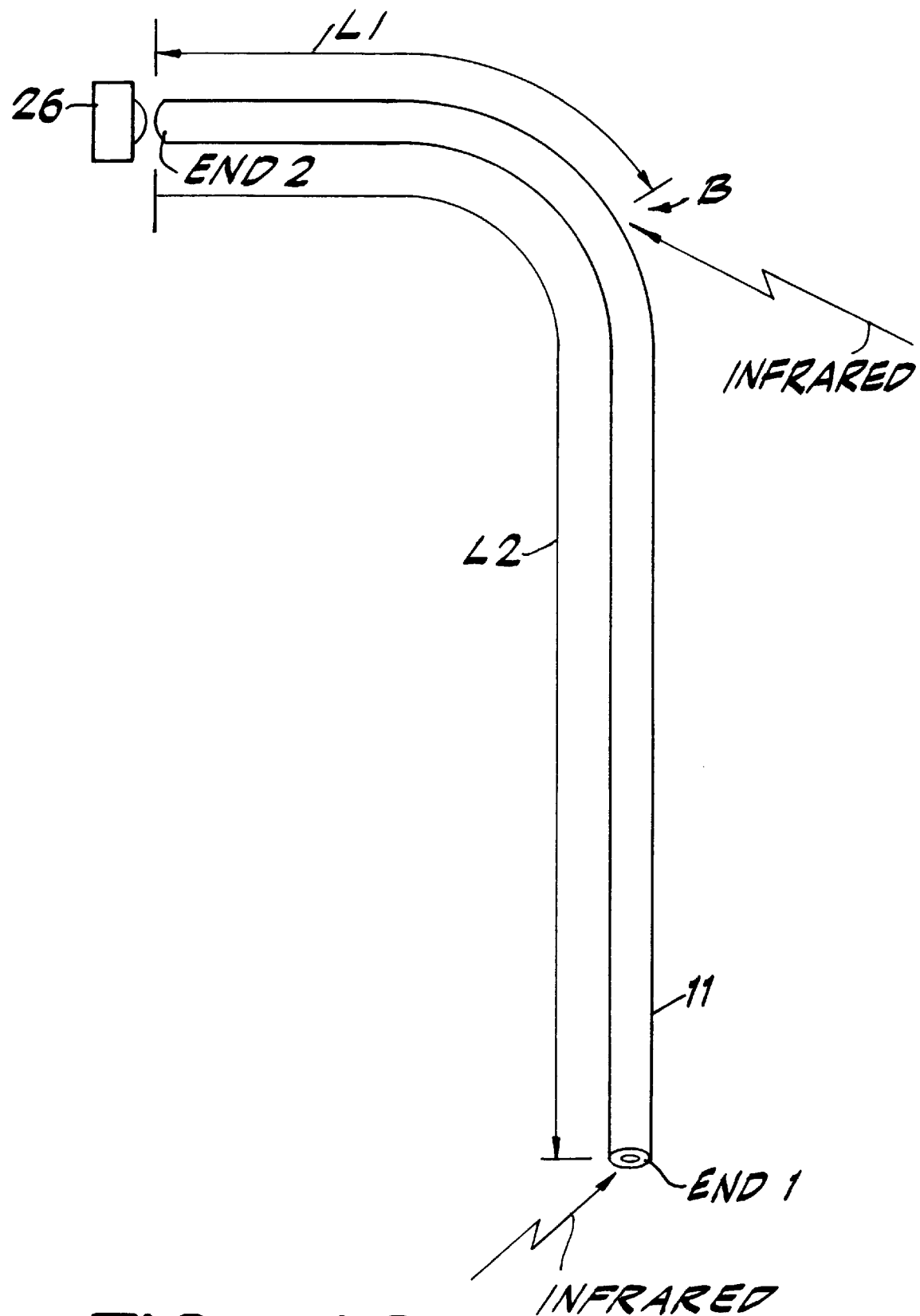
FIG. 18 is a schematic illustration useful in explaining how infrared energy is coupled into the infrared transmissive member.
Figure 19:
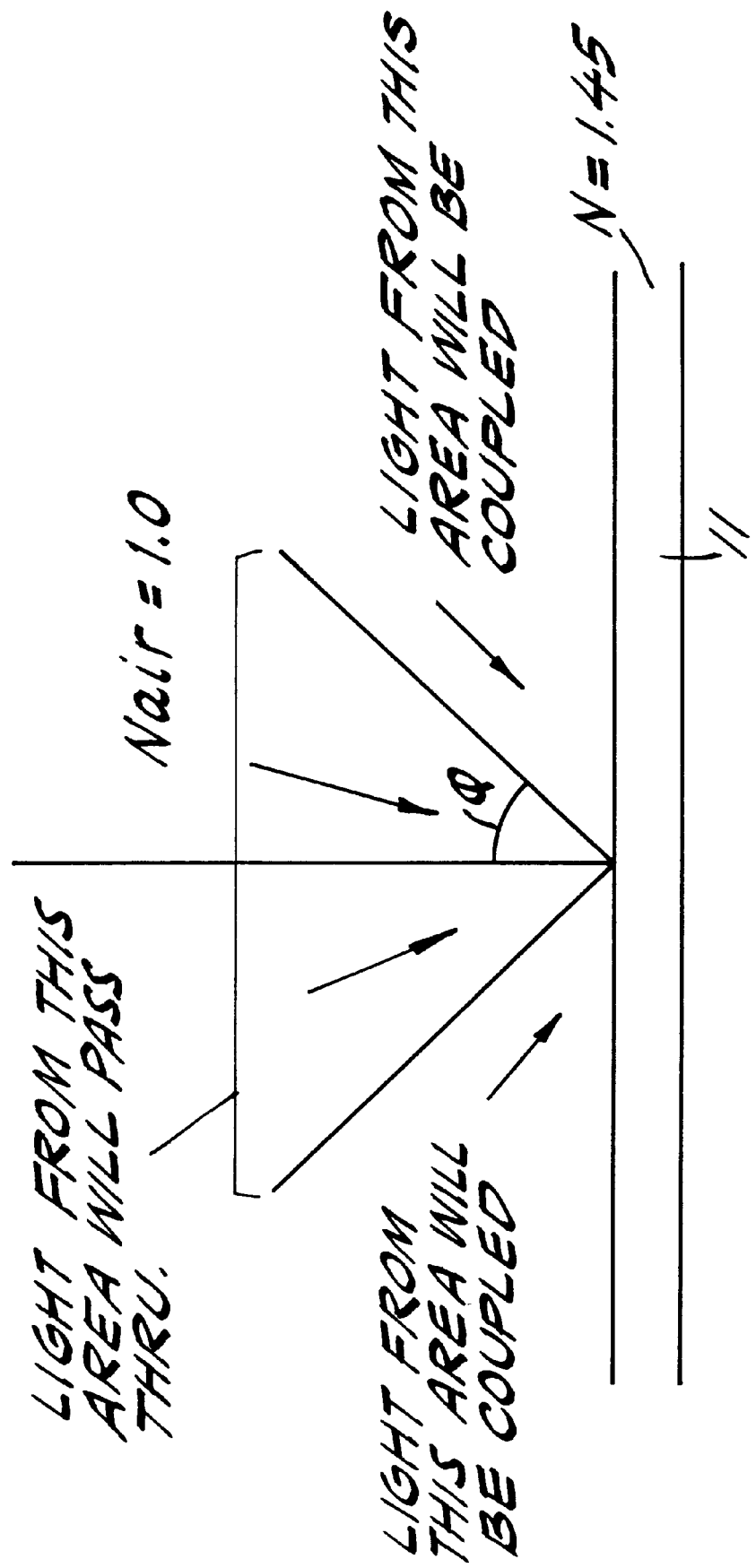
FIG. 19 is a further schematic illustration useful in explaining how infrared energy is coupled into the infrared transmissive member.

With reference to FIG. 18, the amount of infrared energy that is conducted to the end of the transmissive member 11 adjacent the infrared responsive circuit component 26 is made up of two components. The first component is the amount of infrared energy that is coupled into the transmissive member at END1, minus the amount of infrared energy that is attenuated within the material as the infrared energy travels a distance L2 to the infrared responsive component. See FIG. 18. The second component is the amount of infrared energy that is coupled through the sides of the transmissive member (eg from a point B, minus the amount of infrared energy that is attenuated within the material as the infrared energy travels a distance (L1) to the infrared responsive component (see FIG. 18). Infrared rays incident on the sides of the tubing at an angle greater than the critical angle $\Theta_c$ will be coupled into the tubing and once coupled into the tubing are subject to total internal reflection (see FIG. 19). In FIG. 19, the tubing shown is an ester based polyurethane tubing having an index of refraction N of about 1.45. The critical angle $\Theta_c = \text{Sin}^{-1} N_1/N_2 =$ about 43°.

Figure 20:
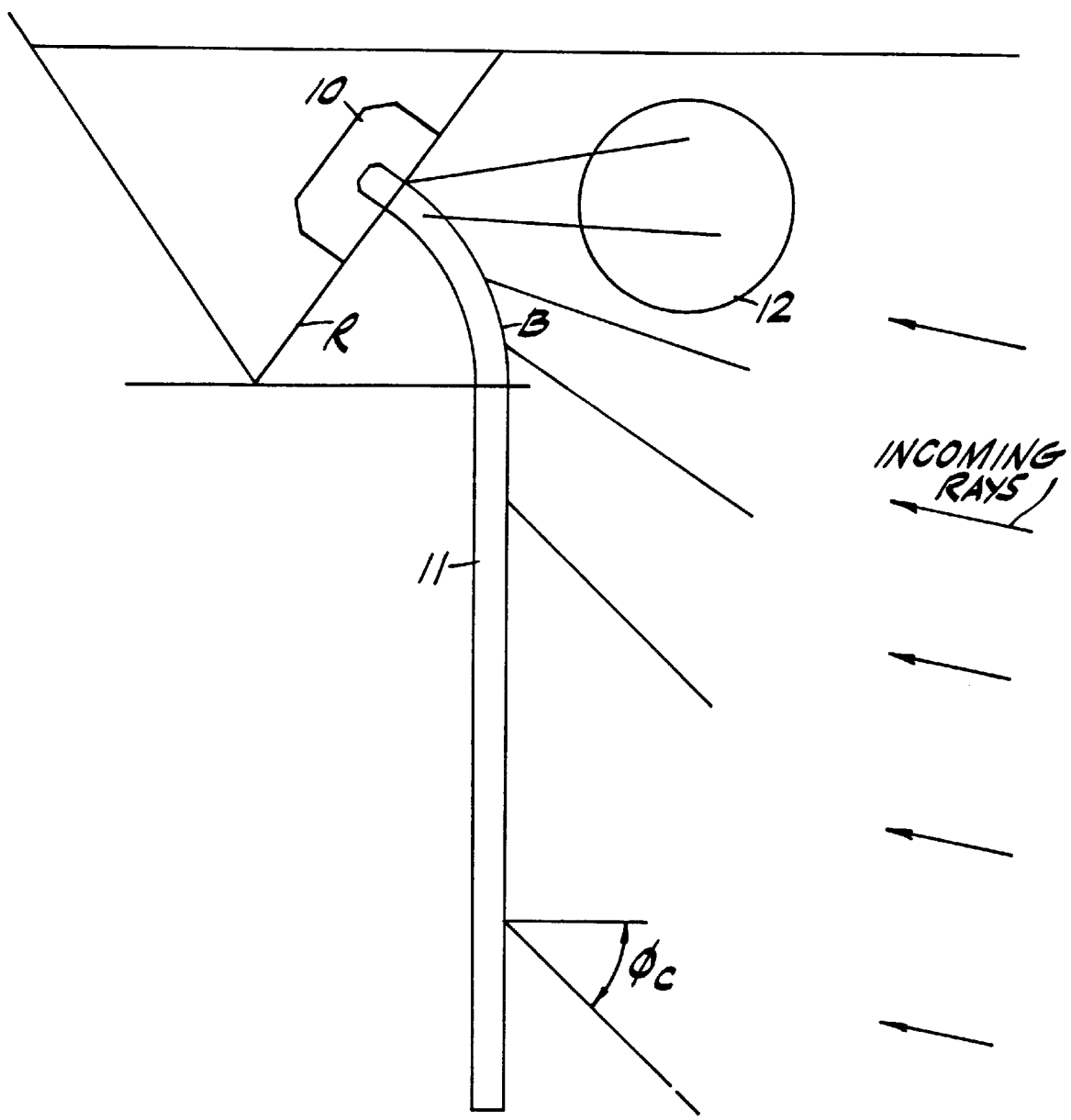
FIG. 20 is a further schematic illustration useful in explaining how infrared energy is coupled into the infrared transmissive member.

The bend in the tube near the end adjacent the infrared responsive component 26 helps improve the range. Infrared rays coming in at certain angles may not be coupled into the straight section of the tube because the incoming angle is less than the critical angle $\Theta_c$, but near the bend B in the tube, the critical angle is approximately parallel with the floor, so all incoming rays can be coupled into the tube (see FIG. 20). These coupled rays also having a shorter distance to travel before they reach the infrared responsive component, so less of the infrared energy in attenuated by the material.

Figure 27:
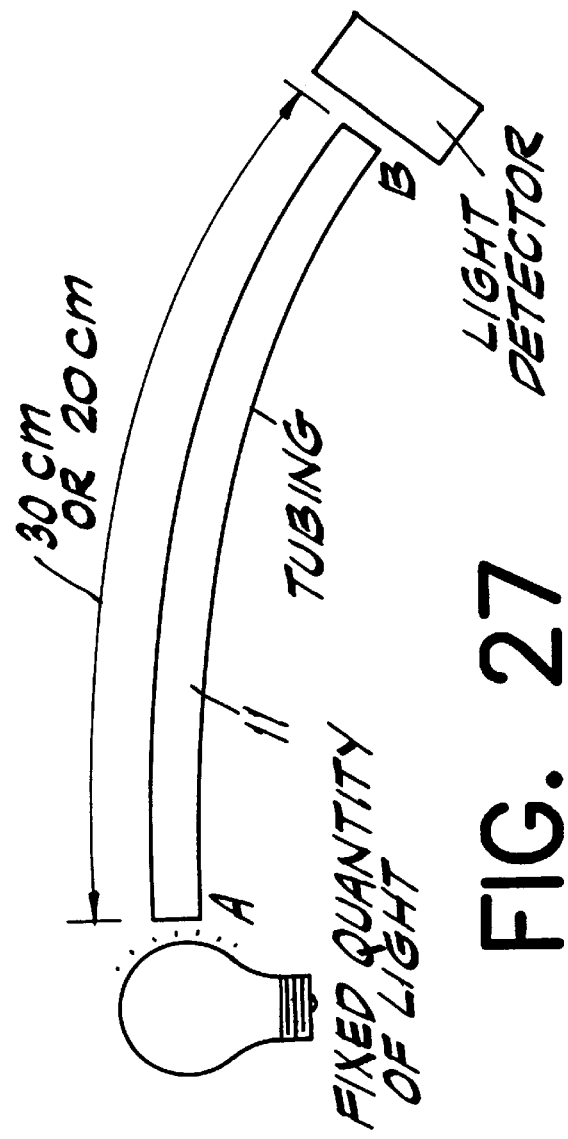
FIG. 27 shows the experimental arrangement used to measure the infrared energy received at an infrared detector after travelling through a section of infrared transmissive tubing. The experiment was performed for both ester based polyurethane tubing and PVC tubing.

FIG. 27 shows the experimental arrangement used to determine the relative amount of infrared energy received at a detector after travelling through a length of tubing.

The way to compare materials for this application is to cut a known length of tubing, measure the amount of infrared energy exiting the tubing from a fixed source, remove a section of the tubing from the entrance end, and then remeasure the amount of exiting infrared energy.

The attenuation is defined as:

Attenuation=(10 log (Power20/Power 30))/Δlength, where Power20=power received at detector for 20 cm section and Power30=power received at detector for 30 cm section, Δlength=difference in length of two sections=10 cm in this case.

Figure 23:
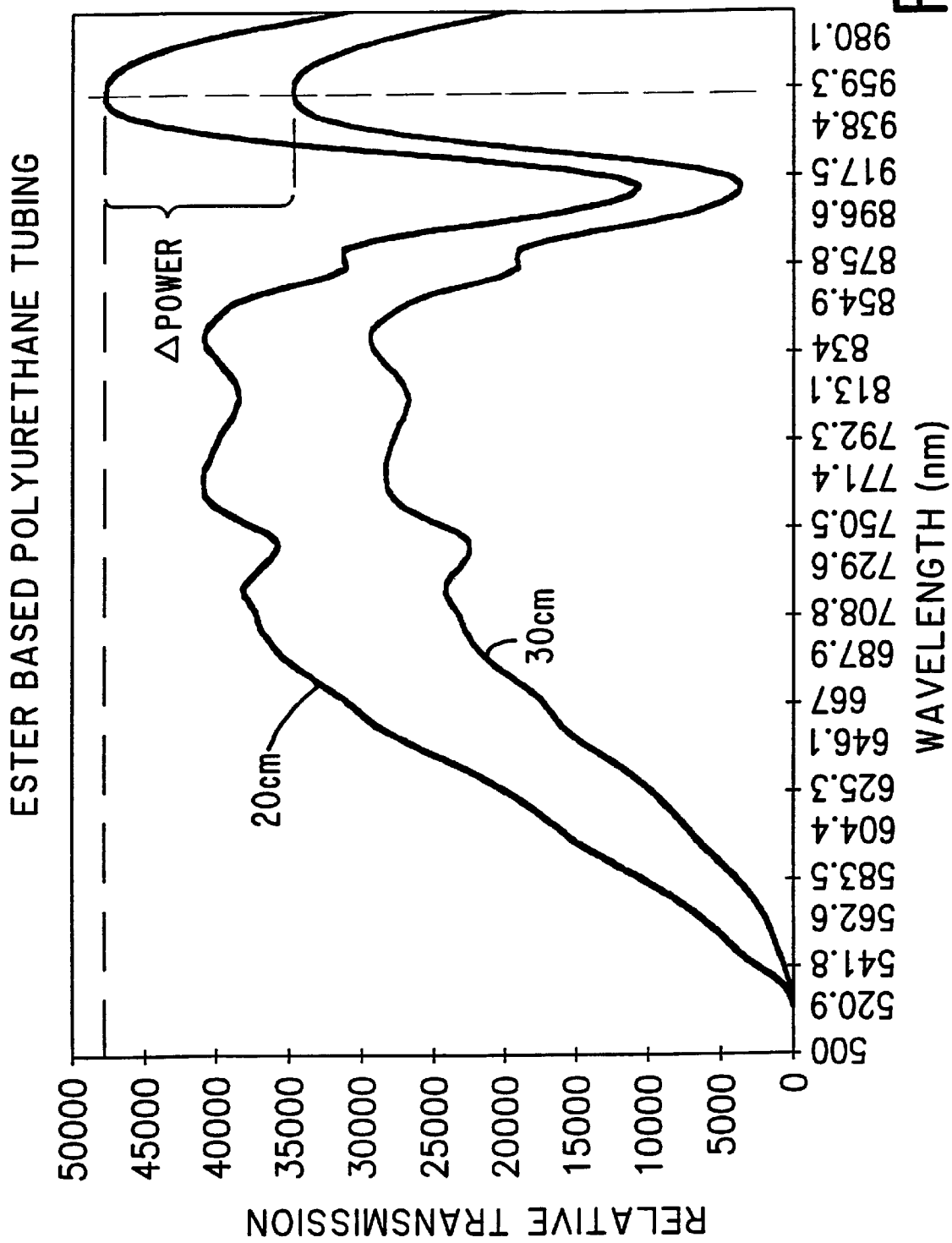
FIG. 23 is a graph illustrating the transmission of ester based polyurethane tubing over a bandwidth between 500 nm and 1000 nm.
Figure 24:
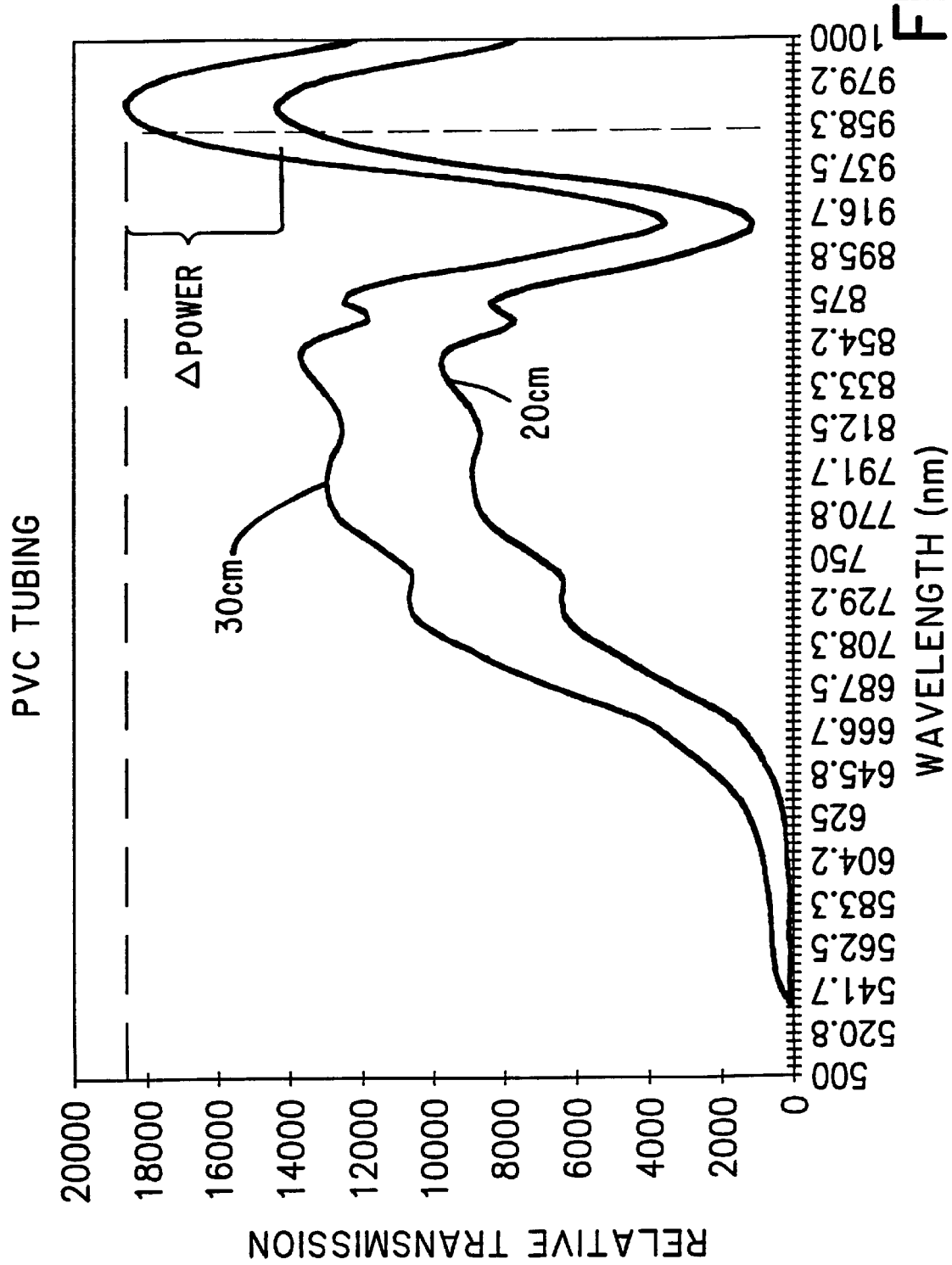
FIG. 24 is a graph illustrating the transmission of PVC tubing over a bandwidth between 500 nm and 1000 nm.

The attenuation of ester based polyurethane tubing was measured to be approximately 14 db/m at 950 nm (see FIG. 21) using the test arrangement of FIG. 27. The attenuation of the PVC tubing was tested to be 12 db/m at 950 nm (see FIG. 22). Using these values, one would expect similar results from either material or slightly better performance from the PVC. However, FIG. 23 and FIG. 24 show the amount of infrared energy received at the detector using the same source for ester based polyurethane tubing and PVC tubing respectively. The amount of infrared energy received at the exit end of the ester based polyurethane tubing was 2.5 times the amount of infrared energy received at the exit end of the PVC tubing for infrared energy of 950 nm. (See dashed lines) If the attenuation is the same for both materials, then the ester based polyurethane tubing must have received more infrared energy to start with at the entrance end. In other words, the ester based polyurethane tubing was able to couple more of the available infrared energy from the source onto the tubing.

Figure 25:
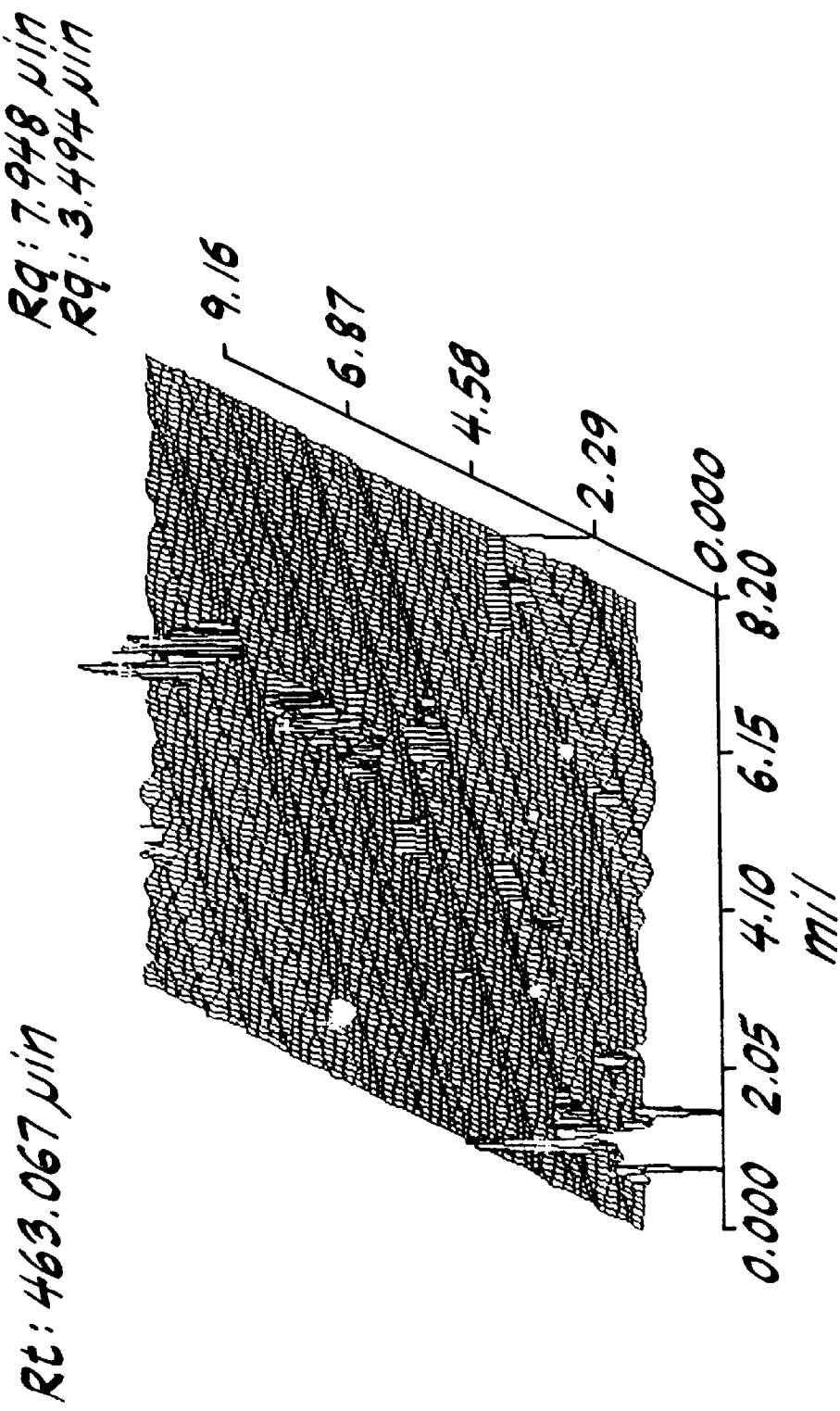
FIG. 25 is a graph of the surface smoothness of a cut end of ester based polyurethane tubing.
Figure 26:
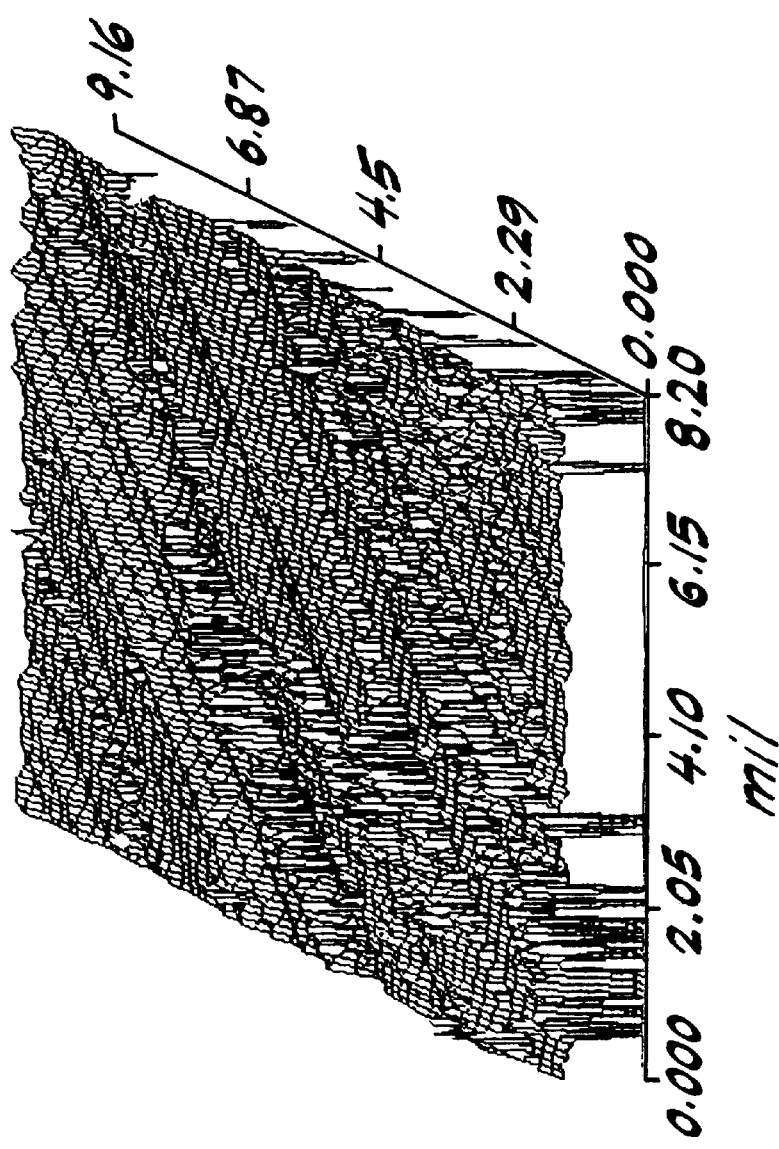
FIG. 26 is a graph of the surface smoothness of a cut end of PVC tubing.

The reason for this may be that when a piece of tubing is cut, the end surface smoothness affects the amount of infrared energy that can be coupled. FIG. 25 is a plot of the surface smoothness for an end cut section of the ester based polyurethane tubing. FIG. 26 is a plot of the surface smoothness for an end cut section of PVC tubing. The plot for the ester based polyurethane tubing is generally smoother than the plot for PVC tubing although the measured numbers do not show a substantial difference. This may be caused by several isolated peaks that skew the calculations.

Figure 21:
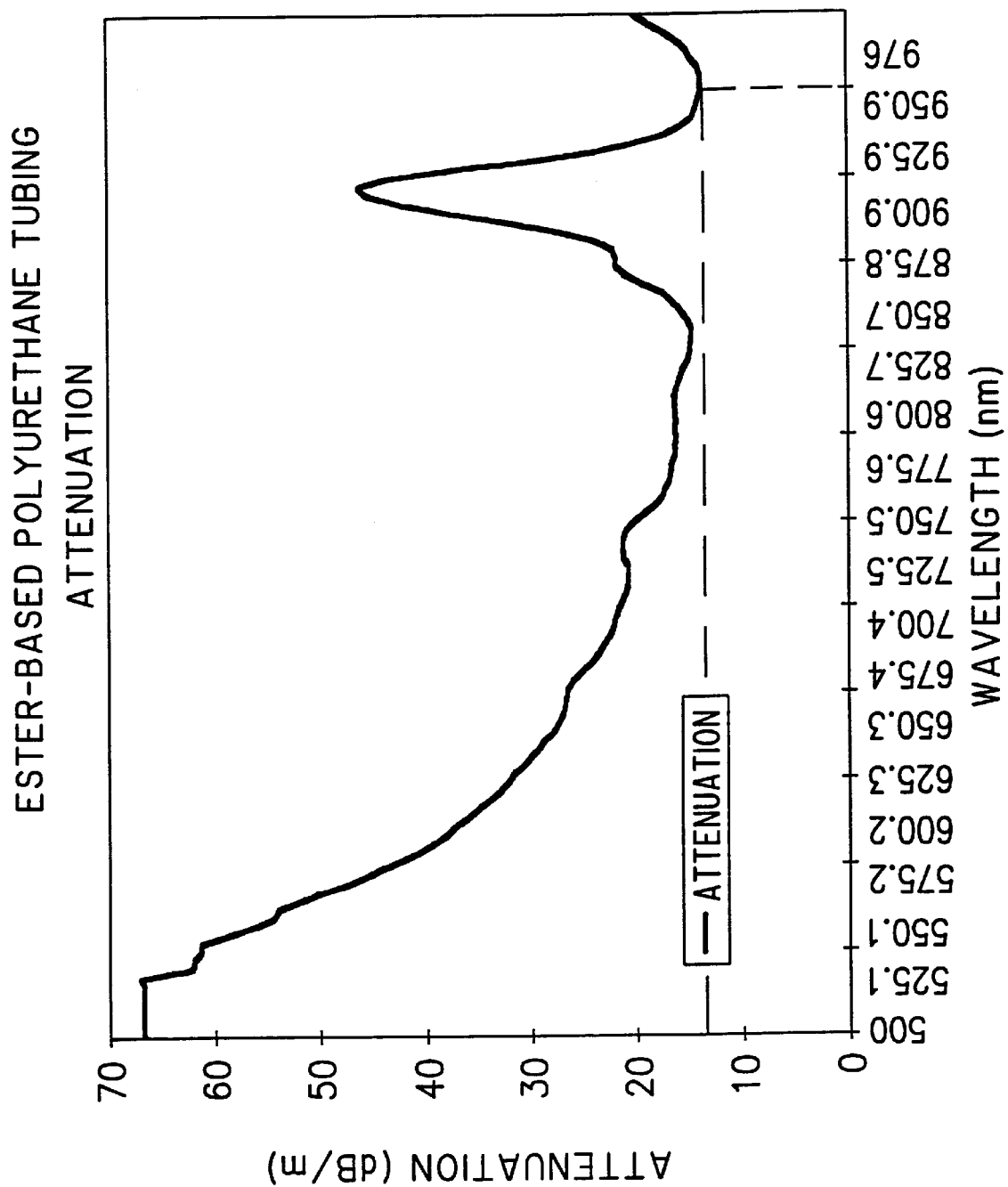
FIG. 21 is a graph illustrating the attenuation of ester based polyurethane tubing over a bandwidth between 500 nm and 1000 nm.
Figure 22:
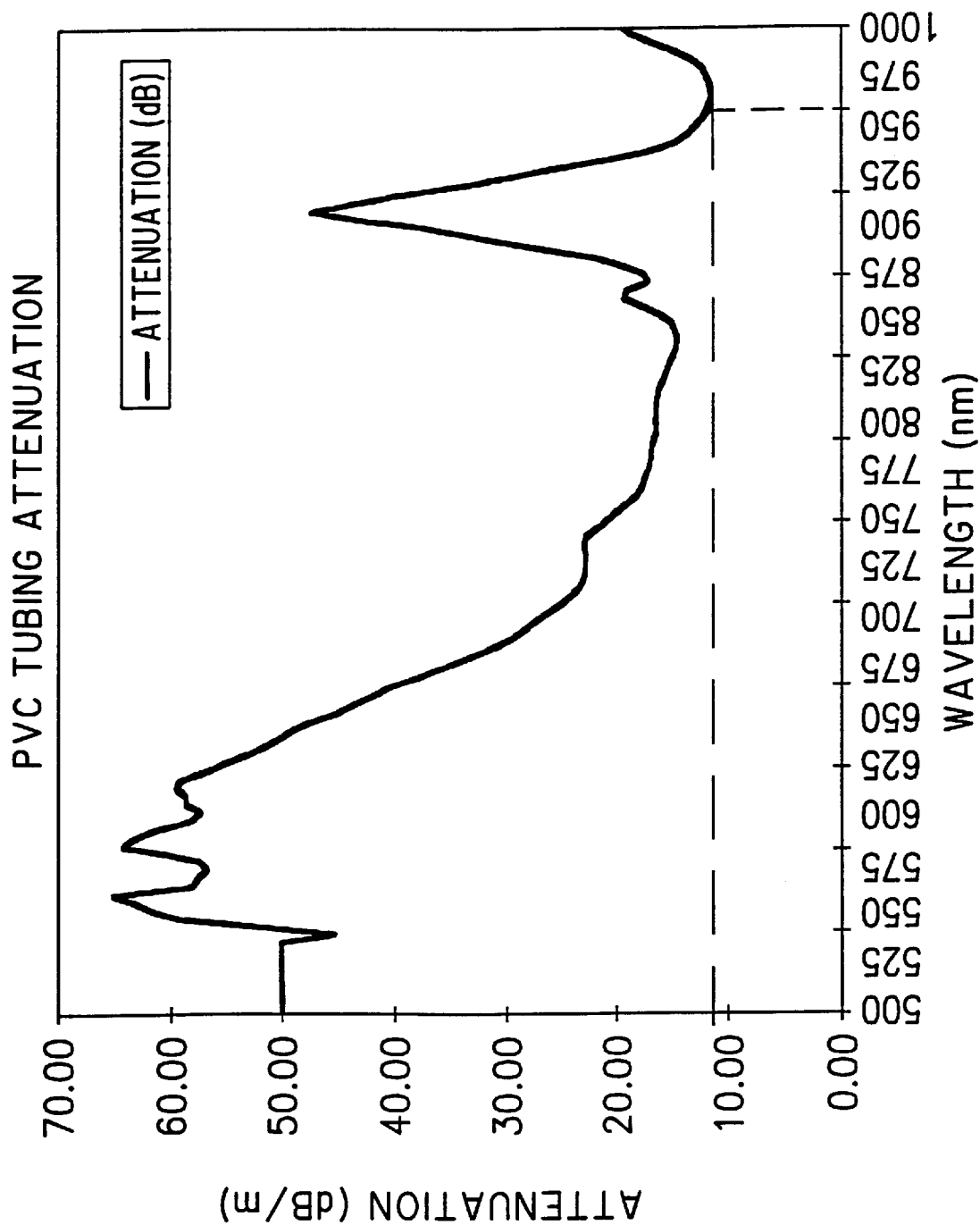
FIG. 22 is a graph illustrating the attenuation of PVC tubing over a bandwidth between 500 nm and 1000 nm.

As shown in FIGS. 21 and 22, the attenuation for infrared energy at 950 nm is less than the attenuation at 880 nm for both the ester-band polyurethane tubing and the PVC tubing.

In summary, the amount of light outputted from the source is the same for both materials, ester based polyurethane and PVC. The attenuation is approximately the same for both materials. The amount of infrared energy received at the detector for the ester based polyurethane tubing is 2.5 times more than for PVC tubing. Therefore, it is believed that the ester based polyurethane tubing must couple in more infrared energy.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An infrared energy transmissive member for conducting infrared energy from a first end of the infrared energy transmissive member to a second end disposed adjacent an infrared responsive circuit component, the member comprising a flexible hollow plastic tube, the tube having an outer diameter and an inner diameter, infrared energy being conducted by the plastic tube from the first end through the tube to the second end between the outer diameter and the inner diameter of the tube, the second end of the member being disposed adjacent the infrared responsive circuit component so that infrared energy in the hollow plastic tube between the outer diameter and the inner diameter is transmitted to the circuit component.

2. The infrared energy transmissive member of claim 1, wherein the hollow plastic tube comprises a clear plastic tube.

3. The infrared energy transmissive member of claim 1, wherein the hollow plastic tube comprises an ester based polyurethane plastic tube.

4. The infrared energy transmissive member of claim 1, wherein the hollow plastic tube has an outer diameter of approximately ¼ inch and an inner diameter of approximately ⅛ inch.

5. The infrared energy transmissive member of claim 1, wherein the hollow plastic tube has an outer diameter of approximately ¼ inch and an inner diameter of approximately 1/16 inch.

6. The infrared energy transmissive member of claim 1, wherein the infrared responsive circuit component has an infrared energy receiving surface having a specified width and wherein the plastic tube has an inner diameter less than the width of said infrared responsive circuit component.

7. The infrared energy transmissive member of claim 3, wherein the plastic tube comprises Tygothane® plastic.

8. The infrared energy transmissive member of claim 1, wherein the infrared energy responsive circuit component comprises an infrared energy-receiving component of an electronic lamp dimming circuit adapted to be controlled by a remote infrared energy transmitter.

9. The infrared energy transmissive member of claim 1, wherein the infrared energy responsive circuit component comprises an infrared energy receiving component of an electronic window treatment control circuit adapted to be controlled by a remote infrared energy transmitter.

10. The infrared energy transmissive member of claim 1, further comprising an end cap disposed at the first end of the member.

11. The infrared energy transmissive member of claim 10, wherein the end cap is decorative.

12. The infrared energy transmissive member of claim 10, wherein the end cap comprises an infrared bandpass filter.

13. The infrared energy transmissive member of claim 1, wherein the member comprises a PVC plastic tube.

14. An infrared energy transmissive member for conducting infrared energy from a first end of the infrared energy transmissive member to a second end disposed adjacent an infrared responsive circuit component, the member comprising a flexible hollow plastic tube;

and further wherein the flexible plastic tube has a malleable rod disposed in the hollow tube thereby allowing the flexible plastic tube to be bent into a desired configuration.

15. The infrared energy transmissive member of claim 14, wherein the malleable rod has a diameter sized so as to fit within the hollow tube.

16. An infrared energy transmissive member for conducting infrared energy from a first end of the infrared energy transmissive member to a second end disposed adjacent an infrared responsive circuit component, the member comprising a flexible hollow plastic tube;

and further comprising an end cap disposed at the first end of the member;

wherein the end cap comprises a lens for focusing infrared energy onto the first end of the member.

17. An infrared energy transmissive member having a first end and a second end for transmitting infrared energy from the first end to the second end, the second end being adjacent an infrared responsive circuit component, the member comprising:

an infrared transmissive flexible plastic hollow tube, the hollow tube having an inner surface and an outer surface, the inner surface having an RMS surface roughness of approximately 1–10 microinches.

18. The infrared energy transmissive member of claim 17, wherein the plastic tube has an outer surface having an RMS surface roughness of approximately 1–10 microinches.

19. The infrared energy transmissive member of claim 17, wherein the plastic tube comprises a clear plastic tube.

20. The infrared energy transmissive member of claim 17, wherein the tube has an outer diameter of approximately ¼ inch and an inner diameter of approximately ⅛ inch.

21. The infrared energy transmissive member of claim 17, wherein the tube has an outer diameter of approximately ¼ inch and an inner diameter of approximately 1/16 inch.

22. The infrared energy transmissive member of claim 17, wherein the plastic tube comprises a tube made of an ester base polyurethane plastic.

23. The infrared energy transmissive member of claim 22, wherein the plastic tube increases the range at which said infrared responsive circuit component can operate in response to infrared signals by approximately 25% over an infrared transmissive member comprising PVC.

24. The infrared energy transmissive member of claims 22, wherein the plastic tube comprises Tygothane® plastic.

25. The infrared energy transmissive member of claim 17, wherein the infrared energy responsive circuit component comprises an infrared energy receiving component of an electronic lamp dimming circuit adapted to be controlled by a remote infrared energy transmitter.

26. The infrared energy transmissive member of claim 17, further comprising an end cap disposed at the first end of the member.

27. The infrared energy transmissive member of claim 26, wherein the end cap is decorative.

28. The infrared energy transmissive member of claim 26, wherein the end cap comprises an infrared bandpass filter.

29. The infrared energy transmissive member of claim 26, wherein the end cap comprises a lens for focusing infrared energy on the first end of the member.

30. The infrared energy transmissive member of claim 17, wherein-the member comprises a PVC plastic tube.

31. An infrared energy transmissive member for conducting infrared energy from a first end of the member to a second end disposed adjacent an infrared responsive circuit component comprising:

an infrared energy transmissive flexible plastic hollow tube having an outer diameter and an inner diameter; and a malleable rod disposed coaxially in said hollow plastic tube, the malleable rod being bendable to enable bending of said plastic tube into a desired configuration;

the malleable rod having a specified diameter, the inner diameter of the hollow plastic tube being equal to or greater than the diameter of said malleable rod.

32. The infrared energy transmissive member of claim 31, wherein the hollow tube has an outer diameter of approximately ¼ inch and an inner diameter of approximately ⅛ inch.

33. The infrared energy transmissive member of claim 31, wherein the hollow tube has an outer diameter of approximately ¼ inch and an inner diameter of approximately 1/16 inch.

34. The infrared energy transmissive member of claim 31, wherein the infrared responsive circuit component has a specified width and the inner diameter of said hollow tube is less than the width of said infrared responsive circuit component.

35. The infrared transmissive member of claim 31, wherein the hollow tube comprises a tube made of an ester based polyurethane plastic.

36. The infrared energy transmissive member of claim 33, wherein said flexible plastic tube has an attenuation for infrared energy of approximately 950 nanometers that is less than attenuation for infrared energy of approximately 880 nanometers.

37. The infrared energy transmissive member of claim 33, wherein a portion of the cross sectional area of said tube between the outer and inner diameters is disposed within the width of said infrared responsive circuit component.

38. The infrared energy transmissive member of claim 31, wherein the infrared energy responsive circuit component comprises an infrared energy receiving component of an electronic lamp dimming circuit adapted to be controlled by a remote infrared energy transmitter.

39. The infrared energy transmissive member of claim 31, wherein the infrared energy responsive circuit component comprises an infrared energy receiving component of an electronic window treatment control circuit adapted to be controlled by a remote infrared energy transmitter.

40. The infrared energy transmissive member of claim 31, further comprising an end cap disposed at the first end of the member.

41. The infrared energy transmissive member of claim 40, wherein the end cap is decorative.

42. The infrared energy transmissive member of claim 40, wherein the end cap comprises an infrared bandpass filter.

43. The infrared energy transmissive member of claim 31, wherein the member comprises a PVC plastic tube.

44. An infrared energy transmissive member for conducting infrared energy from a first end of the infrared energy transmissive member to a second end disposed adjacent an infrared responsive circuit component, the member comprising a flexible hollow plastic tube, a bend being provided in the tube, the bend being provided in a location adapted to be exposed to infrared energy for controlling the infrared responsive circuit component, the bend coupling infrared energy into the tube.

45. The infrared energy transmissive member of claim 44, wherein the bend is disposed near the second end adjacent the infrared responsive circuit component so that less attenuation of infrared energy coupled at the bend occurs in the tube.

46. The infrared energy transmissive member of claim 44, wherein infrared energy reflective material is disposed near the tube.

47. The infrared energy transmissive member of claim 46, wherein the infrared energy reflective material is disposed near the bend in the tube.

48. The infrared energy transmissive member of claim 46, wherein infrared energy reflective material is disposed near the bend in the tube.

49. The infrared energy transmissive member of claim 44 wherein infrared energy reflective material is disposed near the first end of the tube.

50. An infrared energy transmissive member for conducting infrared energy from a first end of the infrared energy transmissive member to a second end disposed adjacent an infrared responsive circuit component, the member comprising a flexible hollow plastic tube, an end cap being disposed at the first end of the tube for focusing infrared energy onto the first end of the tube.

51. The infrared energy transmissive member of claim 50, wherein the end cap comprises a lens.

52. The infrared energy transmissive member of claim 51, wherein the lens is a fresnel lens.

53. The infrared energy transmissive member of claim 50, wherein the end cap comprises an infrared filter.

54. An infrared energy transmissive member for conducting infrared energy from a first end of the infrared energy transmissive member to a second end disposed adjacent an infrared responsive circuit component, the member comprising a flexible hollow plastic tube disposed so as to receive infrared energy substantially perpendicular to the first end, the tube extending out through an opening in an adjacent member, the tube having an outer diameter and an inner diameter, infrared energy being conducted by the plastic tube from the first end through the tube to the second end between the outer diameter and the inner diameter of the tube, the second end of the member being disposed adjacent the infrared responsive circuit component so that infrared energy in the hollow plastic tube between the outer diameter and the inner diameter is transmitted to the circuit component.

55. The infrared energy transmissive member of claim 54, wherein the tube is capable of receiving infrared energy from a distance of about 30 feet and coupling said infrared energy to the infrared responsive circuit component for effective control of an element controlled by the infrared responsive circuit component.

56. An infrared energy transmissive member having a first end and a second end for transmitting infrared energy from the first end to the second end, the second end being adjacent an infrared responsive circuit component, the member comprising:

an infrared transmissive flexible plastic hollow tube, the hollow tube having an inner surface and an outer surface, the outer surface having an RMS surface roughness of approximately 1–10 microinches.

57. The infrared energy transmissive member of claim 56, wherein the plastic tube has an inner surface having an RMS surface roughness of approximately 1–10 microinches.

58. The infrared energy transmissive member of claim 57, wherein the plastic tube has an inner surface having an RMS surface roughness of approximately 1–4 microinches.

* * * * *